US012108308B2

(12) United States Patent
Liu et al.

(10) Patent No.: US 12,108,308 B2
(45) Date of Patent: Oct. 1, 2024

(54) USER EQUIPMENT ASSISTANCE INFORMATION FOR MULTICAST AND BROADCAST SERVICES

(71) Applicant: QUALCOMM Incorporated, San Diego, CA (US)

(72) Inventors: Le Liu, Fremont, CA (US); Alberto Rico Alvarino, San Diego, CA (US); Prasad Reddy Kadiri, San Diego, CA (US); Umesh Phuyal, San Diego, CA (US); Bharat Shrestha, San Diego, CA (US); Juan Montojo, San Diego, CA (US); Peter Gaal, San Diego, CA (US); Wanshi Chen, San Diego, CA (US); Kazuki Takeda, Tokyo (JP); Ayan Sengupta, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/341,801

(22) Filed: Jun. 8, 2021

(65) Prior Publication Data

US 2021/0392466 A1 Dec. 16, 2021

Related U.S. Application Data

(60) Provisional application No. 63/037,778, filed on Jun. 11, 2020.

(51) Int. Cl.
*H04W 4/06* (2009.01)
*H04L 1/1867* (2023.01)
(Continued)

(52) U.S. Cl.
CPC ............. *H04W 4/06* (2013.01); *H04L 1/1896* (2013.01); *H04W 8/24* (2013.01); *H04W 24/10* (2013.01)

(58) Field of Classification Search
None
See application file for complete search history.

(56) References Cited

U.S. PATENT DOCUMENTS

2004/0224698 A1* 11/2004 Yi .................... H04W 76/10
455/515
2010/0093312 A1* 4/2010 Roh ..................... H04W 8/186
455/411

(Continued)

*Primary Examiner* — Otis L Thompson, Jr.
(74) *Attorney, Agent, or Firm* — Holland & Hart LLP

(57) ABSTRACT

Methods, systems, and devices for wireless communications are described. A user equipment (UE) may identify a multicast service available for subscription by the UE or to which the UE is already subscribed. The UE may transmit a message, to a network node, that may include UE assistance information (UAI) indicating at least one of a UE capability to process multicast transmissions or a feedback scheme preference for reporting feedback for the multicast transmissions. The UAI may also include at least one of a multicast carrier preference, band or carrier measurement report, a multicast priority indication, or a measurement and reporting scheme preference for the multicast transmissions. The network node may receive the UAI and determine one or more parameters for multicast communications with the UE based on the UAI. The UE may receive the multicast transmissions from the network node in accordance with the UAI.

28 Claims, 18 Drawing Sheets

(51) Int. Cl.
*H04W 8/24* (2009.01)
*H04W 24/10* (2009.01)

(56) References Cited

U.S. PATENT DOCUMENTS

| | | | |
|---|---|---|---|
| 2014/0036676 A1* | 2/2014 | Purnadi | H04W 36/0058 370/235 |
| 2014/0334389 A1* | 11/2014 | Abdel-Samad | H04W 74/004 370/328 |
| 2015/0103724 A1* | 4/2015 | Xu | H04W 4/06 370/312 |
| 2016/0119762 A1* | 4/2016 | Zhu | H04B 7/0452 370/312 |
| 2016/0150420 A1* | 5/2016 | Byun | H04W 16/08 370/312 |
| 2016/0211980 A1* | 7/2016 | Zhu | H04W 72/30 |
| 2016/0337876 A1* | 11/2016 | Östrup | H04W 76/40 |
| 2018/0145839 A1* | 5/2018 | Lee | H04W 72/23 |
| 2019/0223156 A1* | 7/2019 | Fujishiro | H04W 76/15 |
| 2019/0230564 A1* | 7/2019 | Kim | H04W 76/34 |
| 2019/0253966 A1* | 8/2019 | Park | H04W 52/0229 |
| 2020/0245398 A1* | 7/2020 | Yang | H04W 72/30 |
| 2020/0351639 A1* | 11/2020 | Shrivastava | H04W 76/40 |
| 2021/0227534 A1* | 7/2021 | Määttanen | G08G 5/0069 |
| 2022/0086685 A1* | 3/2022 | Kang | H04W 4/06 |
| 2022/0159568 A1* | 5/2022 | Kim | H04W 72/21 |
| 2022/0217508 A1* | 7/2022 | Xiong | H04W 4/06 |
| 2023/0117327 A1* | 4/2023 | Lee | H04W 12/0431 370/329 |
| 2023/0122848 A1* | 4/2023 | Kim | H04W 52/365 455/522 |
| 2023/0133369 A1* | 5/2023 | Matsumura | H04W 72/1273 370/329 |
| 2023/0135699 A1* | 5/2023 | Liao | H04W 28/0268 370/252 |
| 2023/0137450 A1* | 5/2023 | Liu | H04W 72/21 370/329 |
| 2023/0209313 A1* | 6/2023 | Chin | H04W 4/06 370/329 |

\* cited by examiner

USER EQUIPMENT ASSISTANCE INFORMATION FOR MULTICAST AND BROADCAST SERVICES

CROSS REFERENCE

The present Application for Patent claims the benefit of U.S. Provisional Patent Application No. 63/037,778 by Liu et al., entitled "USER EQUIPMENT ASSISTANCE INFORMATION FOR MULTICAST AND BROADCAST SERVICES," filed Jun. 11, 2020, assigned to the assignee hereof, and expressly incorporated by reference herein.

FIELD OF TECHNOLOGY

The following relates generally to wireless communications and more specifically to user equipment (UE) assistance information (UAI) for multicast and broadcast services (MBSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive multicast or unicast transmissions from one or more network nodes. In some cases, the network environment or UE communication parameters may change. Network procedures to update the multicast or unicast transmissions based on the network or UE changes may be improved.

SUMMARY

The described techniques relate to improved methods, systems, devices, and apparatuses that support user equipment (UE) assistance information (UAI) for multicast and broadcast services (MBSs). Generally, the described techniques provide for a UE to transmit UAI to a network node that the network node may use to efficiently and reliably schedule multicast transmissions, unicast transmissions, or a combination thereof to the UE. The UE may identify a multicast service available for subscription by the UE or to which the UE is already subscribed. The UE may transmit a message, to a network node, that may include UAI indicating at least one of a UE capability to process multicast transmissions or a feedback scheme preference for reporting feedback for the multicast transmissions. The UAI may also include at least one of a multicast carrier preference, band or carrier measurement report, a multicast priority indication, or a measurement and reporting scheme preference for the multicast transmissions. The network node may receive the UAI and determine one or more parameters for multicast communications with the UE based on the UAI. The UE may receive the multicast transmissions from the network node in accordance with the UAI.

A method of wireless communication at a UE is described. The method may include identifying a multicast service available for subscription by the UE or to which the UE is already subscribed, transmitting a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receiving the multicast transmissions in accordance with the UAI.

An apparatus for wireless communication is described. The apparatus may include a processor, memory coupled with the processor, and instructions stored in the memory. The instructions may be executable by the processor to cause the apparatus to identify a multicast service available for subscription by the UE or to which the UE is already subscribed, transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receive the multicast transmissions in accordance with the UAI.

Another apparatus for wireless communication is described. The apparatus may include means for identifying a multicast service available for subscription by the UE or to which the UE is already subscribed, transmitting a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receiving the multicast transmissions in accordance with the UAI.

A non-transitory computer-readable medium storing code for wireless communication is described. The code may include instructions executable by a processor to identify a multicast service available for subscription by the UE or to which the UE is already subscribed, transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receive the multicast transmissions in accordance with the UAI.

Some examples of the method, apparatuses, and non-transitory computer-readable medium described herein may further include operations, features, means, or instructions for including in the UAI, as the feedback scheme preference, an indication of at least one of a first feedback scheme associated with transmission of both positive acknowledgment (ACK) and negative acknowledgment (NACK) feedback, a second feedback scheme associated with transmission of group NACK feedback, or a third feedback scheme associated with transmission of no feedback.

Some examples of the method, apparatuses, and non-transitory computer-readable medium described herein may further include operations, features, means, or instructions for including in the UAI, as the measurement and reporting scheme preference, an indication of at least one of a first measurement and reporting scheme associated with layer one (L1) measurement and reporting, or a second measurement and reporting scheme associated with layer three (L3) measurement and reporting.

Some examples of the method, apparatuses, and non-transitory computer-readable medium described herein may further include operations, features, means, or instructions for including in the UAI, as the UE capability to process the multicast transmissions, an indication of at least one of a number of control resource sets the UE supports for multicast communications, a bandwidth the UE supports for multicast transmissions, or a UE capability type.

Some examples of the method, apparatuses, and non-transitory computer-readable medium described herein may further include operations, features, means, or instructions for including in the UAI at least one of a carrier preference for the multicast service, or a band or carrier measurement report.

In some examples of the method, apparatuses, and non-transitory computer-readable medium described herein, transmitting the message with the UAI may include operations, features, means, or instructions for transmitting the UAI in one or more layers based on a multicast architecture of a network providing the multicast service.

In some examples of the method, apparatuses, and non-transitory computer-readable medium described herein, the multicast architecture includes a communication flow for the message that flows from the UE to a core network to a base station, where the base station establishes associated multicast radio bearers (MRBs) with the UE.

In some examples of the method, apparatuses, and non-transitory computer-readable medium described herein, transmitting the message with the UAI further may include operations, features, means, or instructions for transmitting the message with the UAI in a protocol data unit (PDU) session establishment message, a PDU session modification message, or a release request message.

In some examples of the method, apparatuses, and non-transitory computer-readable medium described herein, the multicast architecture includes a communication flow for the message that flows from the UE to a base station to a core network, where the core network establishes associated MRBs with the UE.

In some examples of the method, apparatuses, and non-transitory computer-readable medium described herein, transmitting the message with the UAI further may include operations, features, means, or instructions for transmitting the message with the UAI in a multicast broadcast service interest indication.

Some examples of the method, apparatuses, and non-transitory computer-readable medium described herein may further include operations, features, means, or instructions for receiving the multicast transmissions while the UE may be in an idle mode or an inactive mode, and determining to switch modes from the idle mode or the inactive mode to a connected mode based on a quality of service preference of the UE.

In some examples of the method, apparatuses, and non-transitory computer-readable medium described herein, transmitting the message with the UAI further may include operations, features, means, or instructions for transmitting the message with the UAI during radio resource control (RRC) connection establishment of a random access procedure based on the determination to switch modes from the idle mode or the inactive mode to the connected mode.

In some examples of the method, apparatuses, and non-transitory computer-readable medium described herein, the message with the UAI may be included in a random access channel (RACH) procedure message 3 (msg3) or RACH procedure message 5 (msg5).

Some examples of the method, apparatuses, and non-transitory computer-readable medium described herein may further include operations, features, means, or instructions for receiving the multicast transmissions while the UE may be in a connected mode, determining to switch modes from the connected mode to an idle mode or an inactive mode based on a power consumption preference of the UE, transmitting the message with the UAI prior to switching from the connected mode to the idle mode or the inactive mode, and switching from the connected mode to the idle mode or the inactive mode.

In some examples of the method, apparatuses, and non-transitory computer-readable medium described herein, receiving the multicast transmissions further may include operations, features, means, or instructions for receiving the multicast transmissions from a serving cell that also provides unicast transmissions to the UE.

Some examples of the method, apparatuses, and non-transitory computer-readable medium described herein may further include operations, features, means, or instructions for identifying that the UE receives unicast transmissions from a reserved cell that may be different from the cell that may be transmitting the multicast transmissions.

Some examples of the method, apparatuses, and non-transitory computer-readable medium described herein may further include operations, features, means, or instructions for transmitting second UAI to the reserved cell, where the second UAI includes one or more of a carrier or bandwidth part (BWP) preference for a unicast service, a unicast processing capability, a timing preference for the unicast service, or a power preference for the unicast service, the unicast processing capability including an indication of a least one of a number of control resources set the UE supports for unicast communications, or a UE capability type.

A method of wireless communication at a network node is described. The method may include receiving, from a UE, a message associated with a multicast service, receiving, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicating with the UE in accordance with the UAI.

An apparatus for wireless communication is described. The apparatus may include a processor, memory coupled with the processor, and instructions stored in the memory. The instructions may be executable by the processor to cause the apparatus to receive, from a UE, a message associated with a multicast service, receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicate with the UE in accordance with the UAI.

Another apparatus for wireless communication is described. The apparatus may include means for receiving, from a UE, a message associated with a multicast service, receiving, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicating with the UE in accordance with the UAI.

A non-transitory computer-readable medium storing code for wireless communication is described. The code may include instructions executable by a processor to receive, from a UE, a message associated with a multicast service, receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicate with the UE in accordance with the UAI.

In some examples of the method, apparatuses, and non-transitory computer-readable medium described herein, the network node may be a core network node that transmits multicast transmissions to the UE in accordance with the UAI.

Some examples of the method, apparatuses, and non-transitory computer-readable medium described herein may further include operations, features, means, or instructions for identifying in the UAI, as the feedback scheme preference, an indication of at least one of a first feedback scheme associated with transmission of both ACK and NACK feedback, a second feedback scheme associated with transmission of group NACK feedback, or a third feedback scheme associated with transmission of no feedback.

Some examples of the method, apparatuses, and non-transitory computer-readable medium described herein may further include operations, features, means, or instructions for identifying in the UAI, as the measurement and reporting scheme preference, an indication of at least one of a first measurement and reporting scheme associated with L1 measurement and reporting, or a second measurement and reporting scheme associated with L3 measurement and reporting.

Some examples of the method, apparatuses, and non-transitory computer-readable medium described herein may further include operations, features, means, or instructions for identifying in the UAI, as the UE capability to process the multicast transmissions, an indication of at least one of a number of control resource sets the UE supports for multicast communications, a bandwidth the UE supports for multicast transmissions, or a UE capability type.

Some examples of the method, apparatuses, and non-transitory computer-readable medium described herein may further include operations, features, means, or instructions for identifying in the UAI at least one or a carrier preference for the multicast service, or a band or carrier measurement report.

In some examples of the method, apparatuses, and non-transitory computer-readable medium described herein, receiving the message with the UAI may include operations, features, means, or instructions for receiving the UAI in one or more layers based on a multicast architecture of a network providing the multicast service.

In some examples of the method, apparatuses, and non-transitory computer-readable medium described herein, the network node may be a core network node and the multicast architecture includes a communication flow for the message that flows from the UE to the core network node to a base station, where the base station establishes associated MRBs with the UE.

In some examples of the method, apparatuses, and non-transitory computer-readable medium described herein, receiving the message with the UAI further may include operations, features, means, or instructions for receiving the message with the UAI in a PDU session establishment message, a PDU session modification message, or a release request message.

In some examples of the method, apparatuses, and non-transitory computer-readable medium described herein, the network node may be a base station and the multicast architecture includes a communication flow for the message that flows from the UE to the base station to a core network, where the core network establishes associated MRBs with the UE.

In some examples of the method, apparatuses, and non-transitory computer-readable medium described herein, receiving the message with the UAI further may include operations, features, means, or instructions for receiving the message with the UAI in a multicast broadcast service interest indication.

Some examples of the method, apparatuses, and non-transitory computer-readable medium described herein may further include operations, features, means, or instructions for transmitting the multicast transmissions while the UE may be in an idle mode or an inactive mode, and receiving the message with the UAI during RRC connection establishment of a random access procedure based on a determination by the UE to switch modes from the idle mode or the inactive mode to a connected mode.

In some examples of the method, apparatuses, and non-transitory computer-readable medium described herein, the message with the UAI may be included in a RACH procedure msg3 or RACH procedure msg5.

Some examples of the method, apparatuses, and non-transitory computer-readable medium described herein may further include operations, features, means, or instructions for transmitting the multicast transmissions while the UE may be in a connected mode, and receiving the message with the UAI prior to the UE switching from the connected mode to an idle mode or an inactive mode.

In some examples of the method, apparatuses, and non-transitory computer-readable medium described herein, the network node transmits both the multicast transmissions to the UE and unicast transmissions to the UE.

In some examples of the method, apparatuses, and non-transitory computer-readable medium described herein, the network node may be a serving cell serving the multicast transmissions.

Some examples of the method, apparatuses, and non-transitory computer-readable medium described herein may further include operations, features, means, or instructions for coordinating the multicast transmissions with one or more unicast transmissions transmitted by one or more other serving cells serving unicast transmissions, where the multicast transmissions and the one or more unicast transmissions may be coordinated via time division multiplexing (TDA) or frequency division multiplexing (FDA) on a X2 or Xn interface.

DETAILED DESCRIPTION

Figure 1:
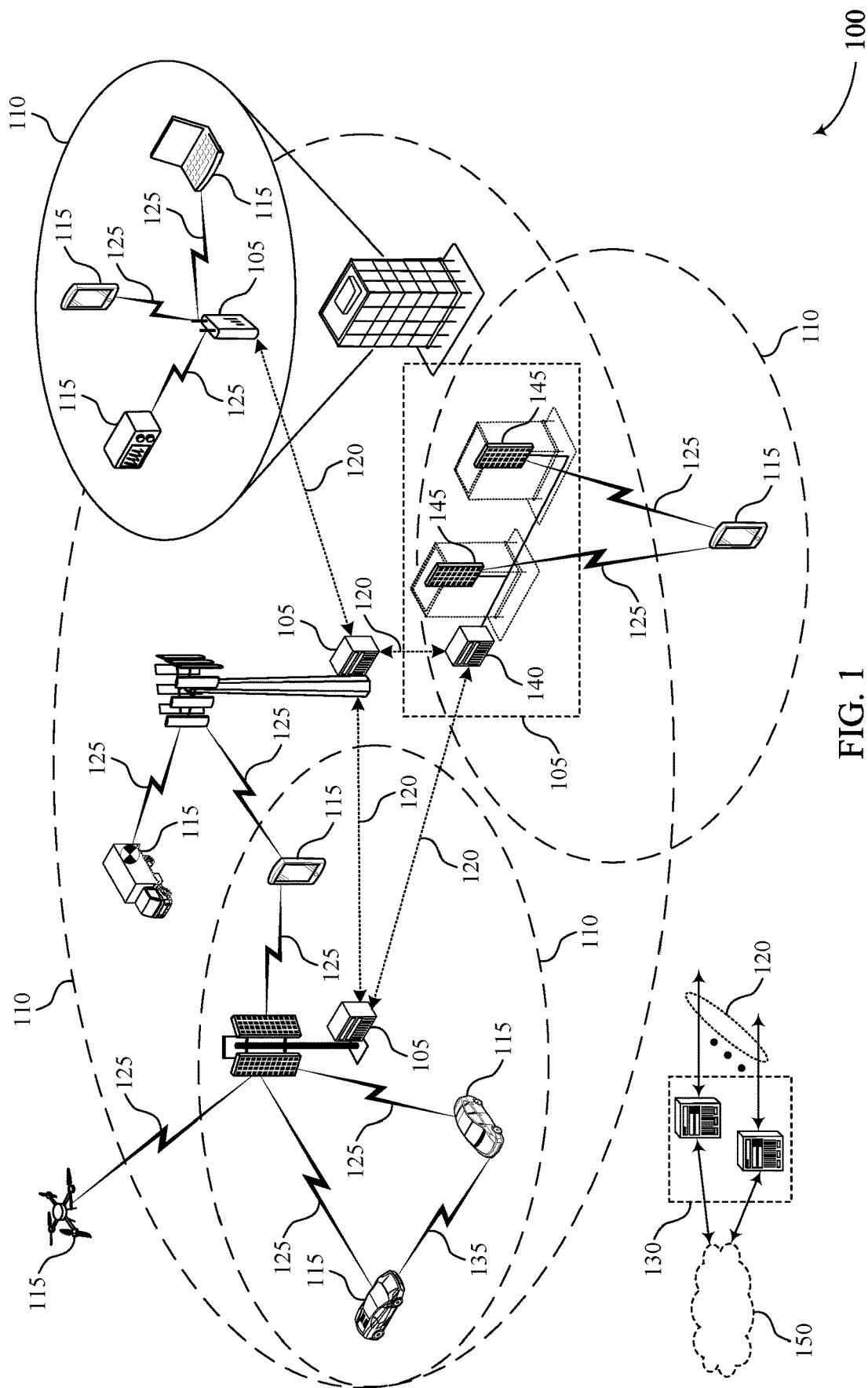
FIG. 1 illustrates an example of a system for wireless communications that supports user equipment (UE) assistance information (UAI) for multicast and broadcast services (MBSs) in accordance with aspects of the present disclosure.

Wireless communications systems may support unicast communications and multicast communications. Unicast communications describe transmissions between a base station and a specific user equipment (UE). Multicast communications (which may also be referred to as broadcast communications) describe transmissions between a base station and a number of UEs. In some cases, multicast communications may be served by a multicast and broadcast service (MBS) or a mobile broadcast and multicast service (MBMS). A UE may be configured to receive unicast and multicast communications from one or more base stations, simultaneously or at different times.

In some communication systems, a UE may not be configured to transmit feedback related to multicast communication systems. For example, a UE may have participated in some MBMS communications that may have been primarily used for lower priority multicast communications, such as television and radio applications. As such, the information provided to the base stations transmitting the multicast communications of the MBMS by the connected UEs was limited (e.g., the UE did not transmit feedback for the multicast transmissions or transmit UE capability information related to the multicast communications). In some wireless communications systems, multiple types of traffic may be transmitted by a multicast service such as an MBS or MBMS in addition to or as an alternative to the television and radio applications. As such, to maintain quality of service (QoS) requirements (e.g., to meet latency requirements, and/or data rate requirements) a UE may be configured to transmit feedback related to the multicast services. In some systems, network procedures to configure feedback information for multicast communications may be improved.

Additionally or alternatively, network parameters or UE-specific parameters may change and the multicast or unicast communications may need to be updated. For example, the interest of the UE to receive multicast communications may change to meet QoS requirements or power restriction requirements of the UE. Additionally or alternatively, the UE may switch modes (e.g., from idle to connected or vice versa) which may impact multicast communications. Additionally or alternatively, if multiple network nodes begin transmitting unicast and multicast communications to the UE, the multicast and unicast may interfere with each other. In some systems, network procedures to update the multicast or unicast communications based on the network or UE changes may be improved.

The techniques described herein provide for a UE to transmit UE assistance information (UAI) to one or more network nodes that configures feedback information the UE may transmit for multicast feedback and that the network nodes may use to efficiently and reliably schedule multicast transmissions, unicast transmissions, or a combination thereof. The UE may be configured to transmit the UAI in response to a change in network parameters or a change in UE parameters to efficiently update the multicast or unicast communications, or both. The UAI may include an indication of a feedback preference of the UE to configure the feedback of the multicast transmissions, a multicast processing capability of the UE, a measurement report, a carrier preference, a service preference, or a priority that ranks multicast and unicast transmissions, or a combination thereof. The feedback preference may indicate that the UE does not prefer to transmit feedback (for example, due to power constraints), or that the UE prefers to transmit positive acknowledgement (ACK) and negative acknowledgement (NACK) feedback, or that the UE prefers to transmit group NACK feedback (e.g., only group NACK feedback). The multicast processing capability of the UE may indicate a number of resources (e.g., a number of control resource set (CORESETs)) or blind decodes the UE may use for multicast, a frequency preference (e.g., bandwidth preference, BWP preference), and/or an indication of UE type (e.g., an indication if the UE is configured with reduced complexity, reduced antennas, or reduced size).

The UE may transmit the measurement report at different occasions and in different messages (e.g., random access channel (RACH) message 3 (msg3) (e.g., radio resource control (RRC) connection request), RACH message 5 (msg5), protocol data unit (PDU) session establishment/modification, release request, or MBS interest indication) based on the architecture of the network providing the multicast service, the mode of the UE, or if the UE decides to switch modes. In some cases, the UE may receive multicast communications from one cell and unicast communications from another cell. To avoid interference of the multicast and unicast communications, the two different cells may coordinate scheduling (via X2/Xn interface). Additionally or alternatively, the UE may transmit UAI to the unicast serving cell that indicates preferred unicast transmission parameters that avoid interference with the multicast communications.

Particular aspects of the subject matter described herein may be implemented to realize one or more advantages. The described techniques may support improvements in multicast communications by improving reliability and QoS among other advantages. As such, supported techniques may include improved network operations and, in some examples, may promote network efficiencies, among other benefits.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to UAI for MBSs.

FIG. 1 illustrates an example of a wireless communications system 100 that supports UAI for MBSs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems may support unicast communications and multicast communications. Unicast communications describe transmissions between a base station 105 and a specific UE 115. Multicast communications (which may also be referred to as broadcast communications) describe transmissions between a base station 105 and a number of UEs 115. A UE 115 may be configured to receive unicast and multicast communications for one or more base stations, simultaneously or at different times. To increase reliability of the unicast and multicast communications, the UE 115 may transmit UAI to one or more base stations 105 communicating with the UE 115 via multicast or unicast transmissions. For example, the UE 115 may identify a multicast service available for subscription by the UE 115 or to which the UE 115 is already subscribed. The UE 115 may transmit a message, to the base station 105 (e.g., a network node) providing the multicast service, that may include UAI indicating at least one of a UE capability to process multicast transmissions or a feedback scheme preference for reporting feedback for the multicast transmissions. The UAI may also include at least one of a multicast carrier preference, band or carrier measurement report, or a multicast priority indication.

The base station 105 may receive the UAI and determine one or more parameters for multicast communications with the UE 115 based on the UAI. The UE 115 may receive the multicast transmissions from the base station 105 in accordance with the UAI. In some cases, the UE 115 may receive unicast transmissions from a second base station 105 that is different than the base station 105 transmitting the multicast transmissions. To mitigate interference between the multicast and unicast transmissions, the UE 115 may additionally transmit UAI related to the unicast transmissions to the second base station 105, where the UAI may indicate resources or communication parameters to be used for unicast transmissions that are different than the resources and parameters used for the multicast transmissions. Additionality or alternatively, the two base stations 105 may coordinate scheduling of the multicast and unicast transmissions (e.g., via a Xn or X2 interface). The UE 115 may transmit the unicast or multicast UAI at different occasions and in different messages (e.g., RACH msg3, RACH msg 5, PDU session establishment/modification, release request, or MBS interest indication) based on the architecture of the network providing the multicast service, the mode of the UE 115 (e.g., connected or idle), or if the UE 115 determines to switch modes.

Figure 2:
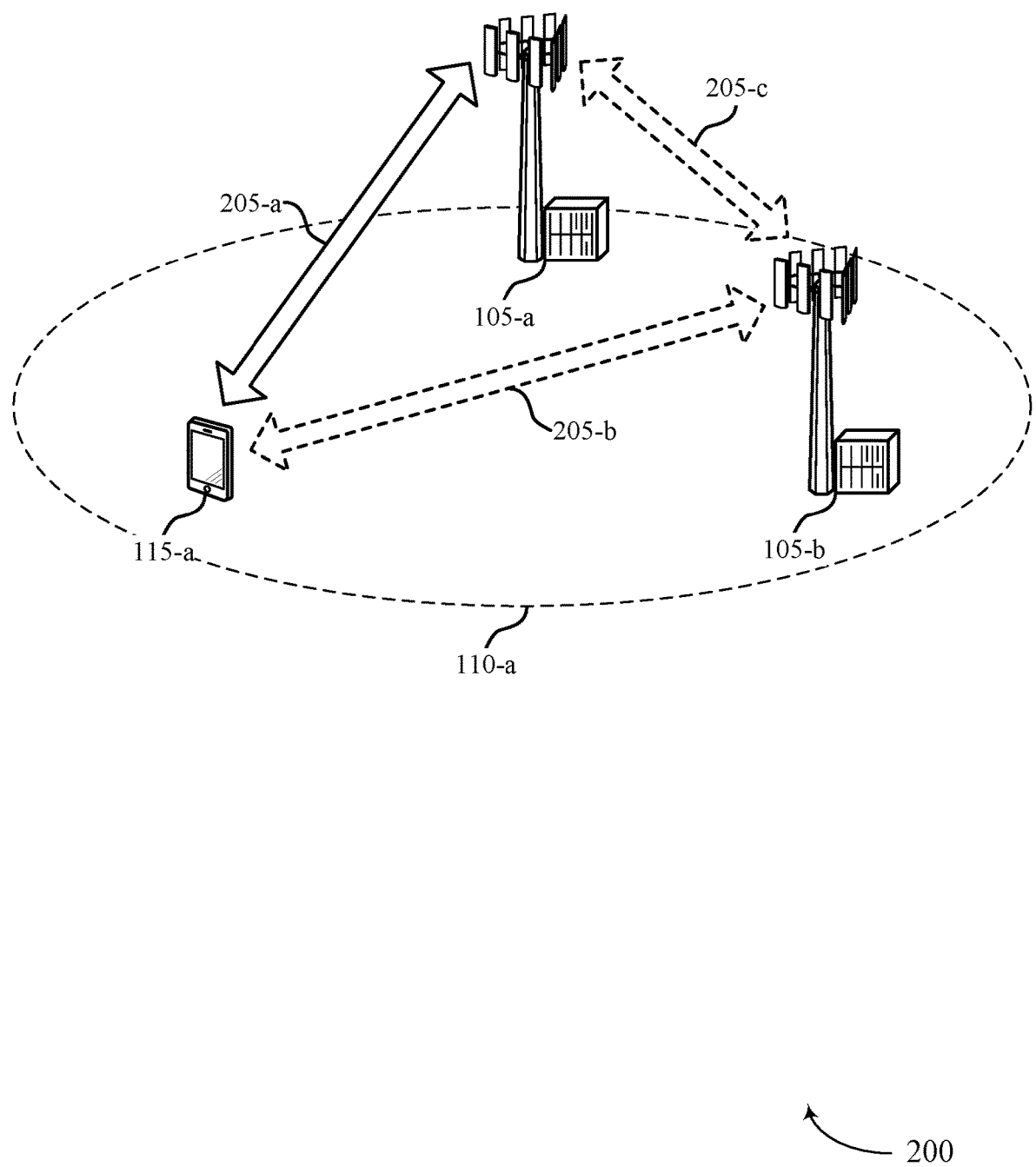
FIG. 2 illustrates an example of a system for wireless communications that supports UAI for MBSs in accordance with aspects of the present disclosure.

FIG. 2 illustrates an example of a wireless communications systems 200 that supports UAI for MBSs in accordance with aspects of the present disclosure. The wireless communications system 200 may include base stations 105-*a* and 105-*b* and UE 115-*a*, which may be examples of base stations 105 and a UE 115 as described with reference to FIG. 1. Base station 105-*a* or base station 105-*b* may serve a geographic coverage area 110-*a*. In some cases, UE 115-*a* may transmit UAI to base station 105-*a* or base station 105-*b* or both to improve multicast and unicast communications.

Wireless communications system 200 (e.g., an NR communications system) may support unicast communications and multicast communications. Unicast communications describe transmissions between a base station 105 and a specific UE 115. Multicast communications (which may also be referred to as broadcast communications) describe transmissions between a base station 105 and a number of UEs 115 (e.g., multiple UEs 115). In some cases, some UEs 115 may be defined to receive a multicast service. As such, the same multicast communication service communicating the same content data is provided simultaneously to a dedicated set of UEs 115 where not all UEs 115 in the multicast coverage area are authorized to receive the data. In some cases, multicast communications may be served by an MBS or an MBMS. A UE 115 may be configured to receive unicast and multicast communications for one or more base stations 105, simultaneously or at different times. For example, UE 115-*a* may receive multicast communications or unicast communications or both from base station 105-*a* via communication link 205-*a*, or receive multicast communications or unicast communications or both from base station 105-*b* via communication link 205-*b*. In some cases, UE 115-*a* may receive unicast and/or multicast communications from base station 105-*a* and receive unicast and/or multicast communications from base station 105-*b*.

In some cases, a UE 115 may receive multicast communications from a base station 105 by transmitting a request to be added to the multicast service. For example, in some wireless communications systems, a UE 115 may participate in an MBMS by transmitting a request to a base station 105 supporting the MBMS to be added to a broadcast for a particular service. The MBMS request may include a variety of information. For example, the MBMS request may specify a preferred MBMS carrier (e.g., absolute radio frequency channel number (ARFCN)), preferred MBMS services (e.g., temporary mobile group identity (TMGI)), MBMS priority (e.g., relative to unicast communications being received by the UE 115) at the UE, for example. Additionally or alternatively, the MBMS request may include receive-only mode information for example if the UE does not have a subscriber identity module (SIM) card. The receive-only mode information may include receive-only MBMS carriers, services, numerology, or bandwidth, or a combination thereof. In some cases, the MBMS request may be referred to as an MBMS interest indication and may be used to inform the network the interest of the UE 115 to receive the MBMS. In some cases, the MBMS interest indication may indicate that the UE 115 is interested or no longer interested in receiving the MBMS. The conveyed information may be useful in establishing and maintaining an MBMS connection. In some cases, the UE 115 may be configured to transmit the MBMS interest indication in some scenarios, such as cell handover, and may not transmit the MBMS interest indication dynamically as network or UE parameters change.

Further, in some systems, MBMS may primarily be used for lower priority multicast communications. As such, the UE 115 may not be configured to transmit feedback relating to communications of the MBMS and the base station 105 transmitting the multicast transmissions may not determine whether the UE 115 received the multicast transmissions. As such, based on a lack of multicast transmission feedback and infrequent MBMS information updates, a base station 105 serving a multicast service may transmit multicast transmissions based on outdated information which may impact network reliability and QoS at a UE 115 and in the case that multicast services are used for higher priority traffic, the network performance may be further impacted.

To improve network performance and QoS related to multicast transmissions, UE 115-*a* may be configured to transmit UAI related to multicast transmissions to one or more base stations 105 providing a multicast service to UE 115-*a* or to one or more base stations 105 UE 115-*a* is requesting a multicast service from. The UAI may include one or more preferred parameters to configure the multicast transmissions from a base station 105. For example, the UAI may include a multicast carrier preference, a service preference, a feedback preference, multicast processing capability, a measurement report (e.g., band or carrier measurement report), a measurement report preference, or an indication of a priority related to multicast and unicast transmissions, or a combination thereof. The feedback preference may indicate that the UE does not prefer to transmit feedback (for example, due to power constraints), or that the UE prefers to transmit ACK and NACK feedback (for example, to meet QoS requirements), or that the UE prefers to transmit group NACK feedback (e.g., only group NACK feedback) (for example, to balance power constraints and QoS requirements). The multicast processing capability of the UE 115 may indicate a number of resources (e.g., CORESETs) the UE 115 may use for multicast, an indication of blind detection for multicast transmissions, a frequency preference (e.g., bandwidth, BWP), and/or an indication of UE type, for example, if the UE 115 is configured with reduced complexity (e.g., the UE 115 is configured with a limited number of antennas, the UE 115 is small in size). The measurement report may explicitly or implicitly indicate one or more measurements of the downlink channel from the base station 105 to which the UAI is directed to. The measurement report preference may indicate that the UE prefers a measurement and reporting scheme associated with layer one (L1) measurement and reporting (e.g., reporting based on L1-reference signal received power (RSRP), L1-reference signal received quality (RSRQ), or L1-signal to interference plus noise ratio (SINR), or a combination thereof), or that the UE prefers a measurement and reporting scheme associated with layer three (L3) measurement and reporting (e.g., reporting based on L3-RSRP, L3-RSRQ, or L3-SINR, or a combination thereof with L3 filtering) to assist scheduling for the multicast transmission. In some cases, the measurement report, may indicate one or more carriers preferred by the UE 115, or indicate one or more carriers that are not preferred by the UE 115, or a combination thereof. The indication of priority may indicate whether unicast transmissions or multicast transmissions from the same base station 105 has the highest priority. For example, UE 115-*a* may receive unicast and multicast transmissions from base station 105-*a*, and UE 115-*a* may determine whether the unicast or multicast transmissions have the highest priority. UE 115-*a* may indicate the highest priority communications in the UAI. In some cases, the priority may be based on the measurement report.

The information included in the UAI may be based on network or UE changes. For example, an initial request to join a multicast service may include a multicast carrier preference, a service preference, a feedback preference, multicast processing capability, and a measurement report, or a combination thereof. If the UE 115 is receiving multicast transmissions from a base station, and one or more network or UE parameters changes, the UE 115 may dynamically transmit a UAI with the updated parameter. For example, UE 115-*a* may be receiving multicast transmissions from base station 105-*a* in accordance with UAI that UE 115-*a* previously transmitted. UE 115-*a* may determine that one or more parameters relating the multicast transmissions changes, such as a preferred carrier of UE 115-*a*. The UE 115-*a* may transmit an updated UAI message to base station 105-*a* including the updated preferred carrier. The updated UAI message may include the other parameters that were not updated or may just include the updated parameters. Base station 105-*a* may identify the updated parameter or parameters in the UAI and update the multicast transmissions based on the updated UAI.

In some cases, UE 115-*a* may be scheduled to receive at least multicast transmissions from base station 105-*a* and at least unicast transmissions from base station 105-*b*. To mitigate interference, UE 115-*a* may transmit unicast UAI to base station 105-*b*. The unicast UAI may include one or more preferred parameters to configure the unicast transmissions from base station 105-*b*. For example, the unicast UAI may include one or more of a unicast carrier preference, frequency (e.g., bandwidth, BWP) preference, processing capability, time preference (e.g., preferred time for a unicast transmission to be transmitted, or a duration of a unicast transmissions), power preference, etc. The unicast processing capability may indicate a number of resources (e.g., CORESETs) the UE may use for unicast transmissions, an indication of blind detection for unicast transmissions, and/or an indication of UE type, for example, if the UE is configured with reduced complexity (e.g., the UE 115 is configured with a limited number of antennas, the UE 115 is small in size). Additionally or alternatively, the base station 105 serving the unicast transmissions may coordinate with one or more base stations 105 serving multicast transmissions. The unicast base station 105 may coordinate the unicast transmissions with the multicast transmissions. For example, base station 105-*b* may request multicast transmission information from base station 105-*a* and base station 105-*b* may schedule the unicast transmissions based on the multicast transmissions indicated by base station 105-*a*. Additionally or alternatively, the unicast base station 105 and the one or more multicast base stations 105 may jointly coordinate the multicast and unicast transmissions. The coordination may be performed over an interface between the base stations 105, such as an X2 or Xn interface. In some cases, the coordination may be performed semi-statically. In some cases, the multicast or unicast transmissions or both may be coordinated via TDM or FDM. TDM may be used to avoid near-far problem, and FDM may be considered for a wide spectrum (e.g., wide NR spectrum).

For example, UE 115-*a* may transmit multicast UAI to base station 105-*a* via communication link 205-*a* when UE 115-*a* is receiving multicast transmissions from base station 105-*a* and may transmit unicast UAI to base station 105-*b* via communication link 205-*b* when UE 115-*a* is receiving unicast transmissions from base station 105-*b*. Additionally or alternatively, base station 105-*a* and base station 105-*b* may coordinate scheduling of the multicast and unicast transmissions via communication link 205-*c*. In some cases, communication link 205-*c* may be a wireless link or a backhaul link.

In some implementations, UE 115-*a* may receive, from base station 105-*a* or base station 105-*b*, the multicast transmissions while UE 115-*a* is in an idle or inactive mode and UE 115-*a* may determine to switch modes from the idle or inactive mode to a connected mode. The determination may be based on a QoS preference of UE 115-*a*. For example, in idle mode or an inactive mode, UE 115-*a* may meet lower QoS thresholds. In some examples, in an inactive mode, a radio access network (RAN) may have user information regarding a UE 115. In some examples, in an idle mode, the RAN may not have user information regarding the UE 115. UE 115-*a* may autonomously determine to achieve higher QoS or receive an indication from a base station 105 or the network to achieve higher QoS. As such, UE 115-*a* may determine to switch to a connected mode. To maintain multicast performance during the transition from an idle or inactive mode, UE 115-*a* may transmit UAI to each base station 105 that UE 115-*a* determines to continue multicast communications with. For example, UE 115-*a* may be receiving multicast transmissions from base station 105-*a* while UE 115-*a* is in an idle or inactive mode. UE 115-*a* may determine to switch modes and determine to continue the multicast service provided by base station 105-*a*. In response to such determinations, UE 115-*a* may transmit UAI to base station 105-*a*.

The UAI transmitted in response to switching from an idle or inactive mode to a connected mode may be transmitted by UE 115-*a* during RRC connection establishment of a RACH procedure. For example, UE 115-*a* may include the UAI in a RACH msg3 or a RACH msg5, or both. In some cases, a limited number of bits may be included in the RACH msg3 for early indication of the UAI. The information included in the UAI may be indicated in a RACH msg5 or the physical uplink shared channel (PUSCH) after connection establishment. The UAI may include an interest indication for receiving a multicast service, a multicast address, multicast session ID, or multicast flow ID, or a combination thereof associated with the current multicast service UE 115-*a* is receiving from base station 105-*a* before entering the connected mode. Additionally or alternatively, UE 115-*a* may include in the UAI a feedback preference for transmitting feedback by UE 115-*a* in the connected mode, one or more of a multicast processing capability, a measurement report preference for assisting multicast scheduling, a measurement report (e.g., band or carrier measurement report), or an indication of priority of multicast and unicast transmissions, or a combination thereof. The feedback preference may indicate that the UE 115 does not prefer to transmit feedback, or that the UE prefers to transmit ACK and NACK feedback, or that the UE prefers to transmit group NACK feedback (e.g., only group NACK feedback). The multicast processing capability of the UE may indicate a number of resources (e.g., a maximum number), such as CORESETs, UE 115-*a* may use for multicast, an indication of blind detection for multicast transmissions, a frequency preference (e.g., bandwidth, BWP), and/or an indication of UE type, for example, if the UE 115 is configured with reduced complexity (e.g., the UE 115 is configured with a limited number of antennas, the UE 115 has limited maximum bandwidth, or the UE 115 is small in size, or a combination thereof). The measurement report may explicitly or implicitly indicate one or more measurements of the downlink channel from the base station 105 the UAI is directed to. The indication of priority may indicate whether unicast transmissions or multicast transmissions from the same base station 105 has the highest priority.

In some cases, some or all of the information included in the UAI may be security sensitive and may be sent after security activation of the connection establishment procedure. In some cases, UE 115-*a* may autonomously determine which information in the UAI is security sensitive and/or which information in the UAI is not security sensitive, or a base station 105 may dynamically, semi-statically, or aperiodically indicate which information in the UAI is security sensitive and/or which information in the UAI is not security sensitive. If some of the UAI information is not security sensitive and may be sent, unprotected, prior to security activation, then the information may be transmitted before the connected mode is established. If some of the UAI information is security sensitive, the information may be transmitted after the connected mode is established. For example, UE 115-*a* may determine based on a predefined criterion that the measurement report is security sensitive information and that the other UAI information is not security sensitive. As such, UE 115-*a* may determine to transmit the UAI in multiple different transmissions, where at least one UAI transmission is transmitted before security protection and at least one UAI transmission is transmitted after security protection. Security protection may be established after the RACH message 5. As such, UE 115-*a* may transmit the non-security sensitive information in RACH msg3 or RACH msg5 and transmit the security sensitive information, such as the measurement report, after the RACH msg5. In some cases, the RACH msg3 may have limited capacity to transmit UAI information. As such, UE 115-*a* may include a limited number of additional bits related to UAI. In some cases, the additional bits may indicate UAI or the additional bits may indicate to the base station 105 that UE 115-*a* is going to transmit UAI in RACH msg5.

In some implementations, UE 115-*a* may receive, from base station 105-*a* or base station 105-*b*, the multicast transmissions while UE 115-*a* is in a connected mode and UE 115-*a* may determine to switch modes from the connected mode to an idle or inactive mode. The determination may be based on a power consumption preference of UE 115-*a*. For example, in a connected mode, UE 115-*a* may consume a large amount of power. UE 115-*a* may autonomously determine to achieve lower power consumption or may receive an indication from a base station 105 or the network to achieve lower power consumption. As such, UE 115-*a* may determine to switch to an idle or inactive mode. Based on UE 115-*a* determining to switch to an idle or inactive mode, UE 115-*a* may transmit UAI to each base station 105 that UE 115-*a* determines to continue multicast communications with during the idle or inactive mode. For example, UE 115-*a* may be receiving multicast transmissions from base station 105-*a* while UE 115-*a* is in a connected mode. UE 115-*a* may determine to switch modes and determine to continue the multicast service provided by base station 105-*a*. In response to such determinations, UE 115-*a* may transmit UAI to base station 105-*a*.

The UAI transmitted in response to switching from a connected mode to idle or inactive mode may be transmitted by UE 115-*a* prior to switching modes. For example, UE 115-*a* may determine to switch from a connected mode to idle or inactive mode, transmit the UAI, and then switch modes. The UAI may include a multicast address, multicast session ID, or multicast flow ID, or a combination thereof associated with the current multicast service UE 115-*a* is receiving from base station 105-*a*. Additionally or alternatively, UE 115-*a* may include in the UAI a feedback preference for transmitting feedback by UE 115-*a* in the idle or inactive mode, one or more of a multicast processing capability, a measurement report (e.g., band or carrier measurement report), or an indication of priority of multicast and unicast transmissions, or a combination thereof as described herein. In some cases, UE 115-*a* may implicitly or explicitly indicate a request to the one or more base stations 105 providing multicast services to UE 115-*a* to stop the multicast services. To implicitly indicate the request, UE 115-*a* may not include in the UAI the multicast address, multicast session ID, or multicast flow ID of the multicast service currently provided to UE 115-*a* in the connected mode. For example, UE 115-*a* in a connected mode may be receiving multicast transmissions from base station 105-*a* and UE 115-*a* may determine to switch to a lower power mode (e.g., idle or inactive mode) and determine to cease the multicast services with base station 105-*a*. UE 115-*a* may transmit a message including UAI prior to switching modes that does not include a multicast address, multicast session ID, or multicast flow ID. As such, base station 105-*a* may identify the request of UE 115-*a* to cease multicast transmissions and base station 105-*a* may stop remove UE 115-*a* from the multicast service.

Figure 3:
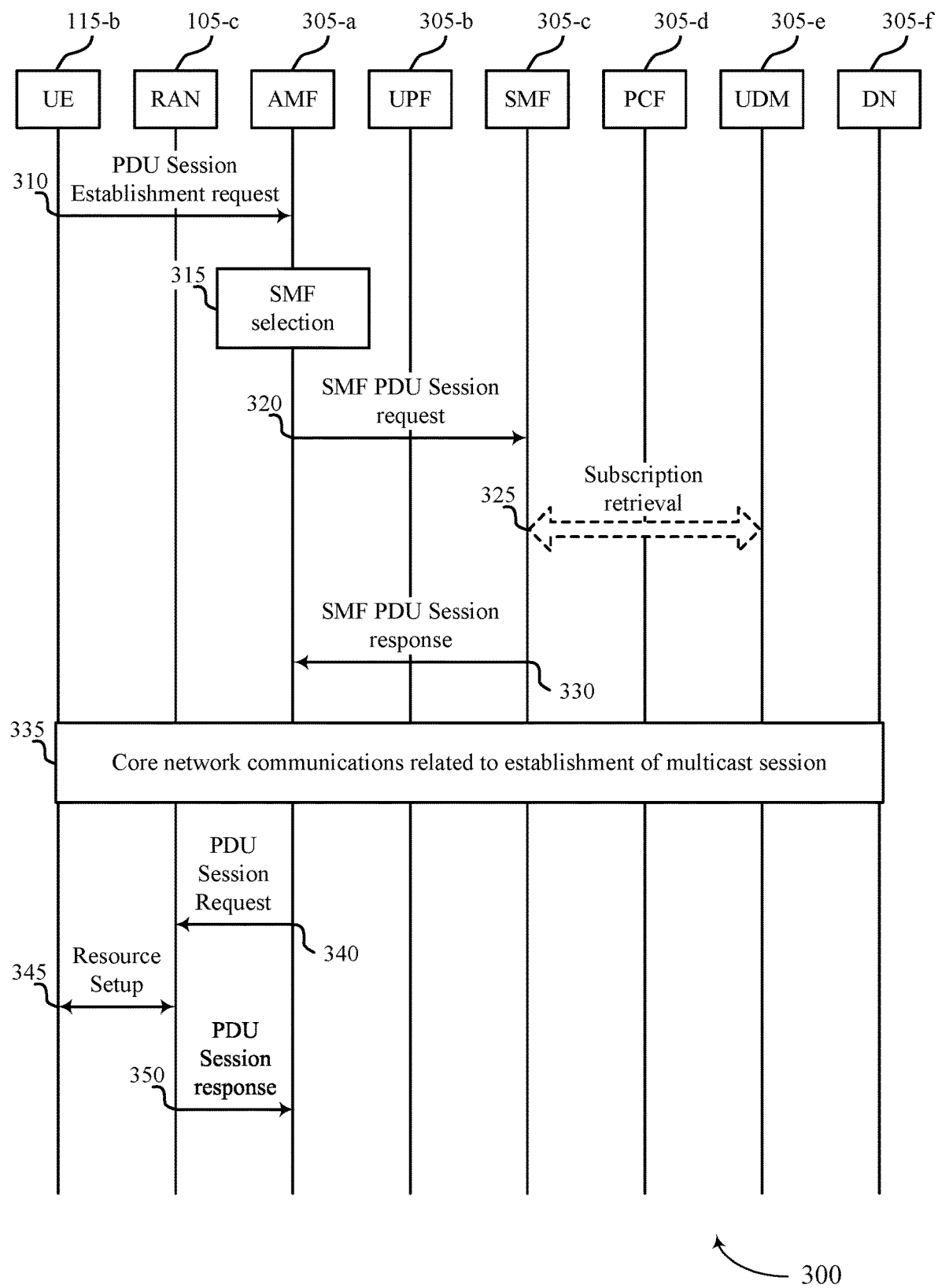
FIGS. 3 through 6 illustrate examples of process flows that support UAI for MBSs in accordance with aspects of the present disclosure.

FIG. 3 illustrates an example of a process flow 300 that supports UAI for MBSs in accordance with aspects of the present disclosure. The process flow 300 may illustrate an example multicast communication procedure. For example, UE 115-*b* may configure multicast and/or unicast UAI and transmit the UAI to the network which may relay the UAI to RAN 305-*a* (e.g., a base station). UE 115-*b* may be an example of the UEs described with reference to FIGS. 1 and 2 and RAN 105-*c* may be an example of the base stations described with reference to FIGS. 1 and 2. In some cases, instead of UE 115-*b* transmitting the UAI, a different type of device (e.g., a base station, one or more functions of the network) may transmit UAI to one or more other devices, such as RAN 105-*c* (e.g., a base station). Alternative examples of the following may be implemented, where some steps are performed in a different order than described or are not performed at all. In some cases, steps may include additional features not mentioned below, or further steps may be added.

In some implementations, multicast communications may be served by networks of different architectures. A UE 115 may transmit the UAI on one or more layers based on the architecture of the network serving the UE 115. In some cases, the multicast service (e.g., 5G MBS) may be based on or similar to a unicast service (e.g., unicast 5GC). In such an architecture, a UE 115 may transmit a message to the core network to trigger setup or trigger a release of a dedicated radio bearer (DRB) (e.g., a unicast radio bearer). For example, the UE 115 may transmit a PDU session establishment request to the core network. The core network may perform one or more negotiation procedures to determine whether traffic should be delivered to the UE 115 via a multicast/broadcast bearer mode (e.g., using a multicast radio bearer (MRB)) or using a unicast mode (e.g., using a DRB). In some cases, the core network may determine that traffic should be delivered to the UE 115 via an MRB and may configure a multicast service session and multicast flows for the UE 115. The core network may transmit an indication of the multicast session to the base station 105 serving the multicast communications.

As such, the multicast architecture may include a communication flow for a session request message that flows from the UE 115 to a core network to a base station 105, where the base station 105 may establish associated MRBs with the UE 115. In some cases, a core network may include one or more functions such as an AMF 305-*a*, UPF 305-*b*, session management function (SMF) 305-*c*, policy control function (PCF) 305-*d*, unified data management (UDM) 305-*e*, and a data network (DN) 305-*f*. The UE 115 may transmit the session request to one or more functions 305 of the core network and one or more functions 305 of the core network may indicate the session establishment to a RAN 105-*c* (e.g., a base station 105). For example, at 310, UE 115-*c* may transmit a PDU session establishment request message (e.g., NAS message) to AMF 305-*a* and the core network may perform one or more negotiations with other core network functions 305. In some cases, the PDU session establishment request may include a PDU session ID, and a PDU session type such as an initial request, an existing PDU session, an emergency request, or a multicast request. The multicast request may include at least one of a multicast address ID, multicast session ID, or flow ID and UAI for multicast as described with reference to FIG. 2.

At 315, AMF 305-*a* may perform SMF selection, where the SMF may be selected based on the SMF being able to handle multicast sessions. AMF 305-*a* may select SMF 305-*c*. At 320, AMF 305-*a* may transmit an SMF PDU session request (e.g., Nsmf_PDUSession_CreateSMContext Request) to SMF 305-*c*. The SMF PDU session request may include multicast related information. At 325, SMF 305-*c* and UDM 305-*e* may perform subscription retrieval procedures (e.g., registration, subscription data retrieval, subscription for updates). At 330, SMF 305-*c* may transmit to AMF 305-*a* an SMF PDU session response (e.g., Nsmf_PDUSession_CreateSMContext Response). The SMF PDU session response may include a request for AMF 305-*a* to transfer a message to RAN 105-*c* and may include multicast related information. At 335, UE 115-*b*, RAN 105-*c*, and the network functions may perform core network communications related to the establishment for a multicast session. The core network communications may include a PDU session authentication and authorization, PCF 305-*d* selection and UPF 305-*b* selection by SMF 305-*c*, session establishment communications between SMF 305-*c* and UPF 305-*b* (e.g., N4 Session Establishment/Modification Request and Response), and a communication transfer message from SMF 305-*c* to AMF 305-*a* (e.g., Namf_Communication_N1N2MessageTransfer).

At 340, AMF 305-*a* may transmit to RAN 105-*c* a PDU session request (e.g., NAS request, N2 PDU Session Request). The PDU session request to RAN 105-*c* may include at least one of a multicast address ID, multicast session ID, or multicast flow ID and UAI for multicast communications between RAN 105-*c* and UE 115-*b*. At 345, UE 115-*b* and RAN 105-*c* may perform resource setup such as AN-specific resource setup (e.g., PDU Session Establishment Accept). In some cases, RAN 105-*c* may perform MRB or DRB selection. RAN 105-*c* may identify an association of UE 115-*c* with a multicast group (e.g., if UE 115-*a* is in a connected mode) and select an MRB based on the identification. At 350, RAN 105-*c* may transmit a PDU session response (e.g., N2 PDU Session Response) to AMF 305-*a*. In some cases, UE 115-*b*, RAN 105-*c*, and the core network functions 305 may perform one or more other communications to setup and perform the multicast communications.

Figure 4:
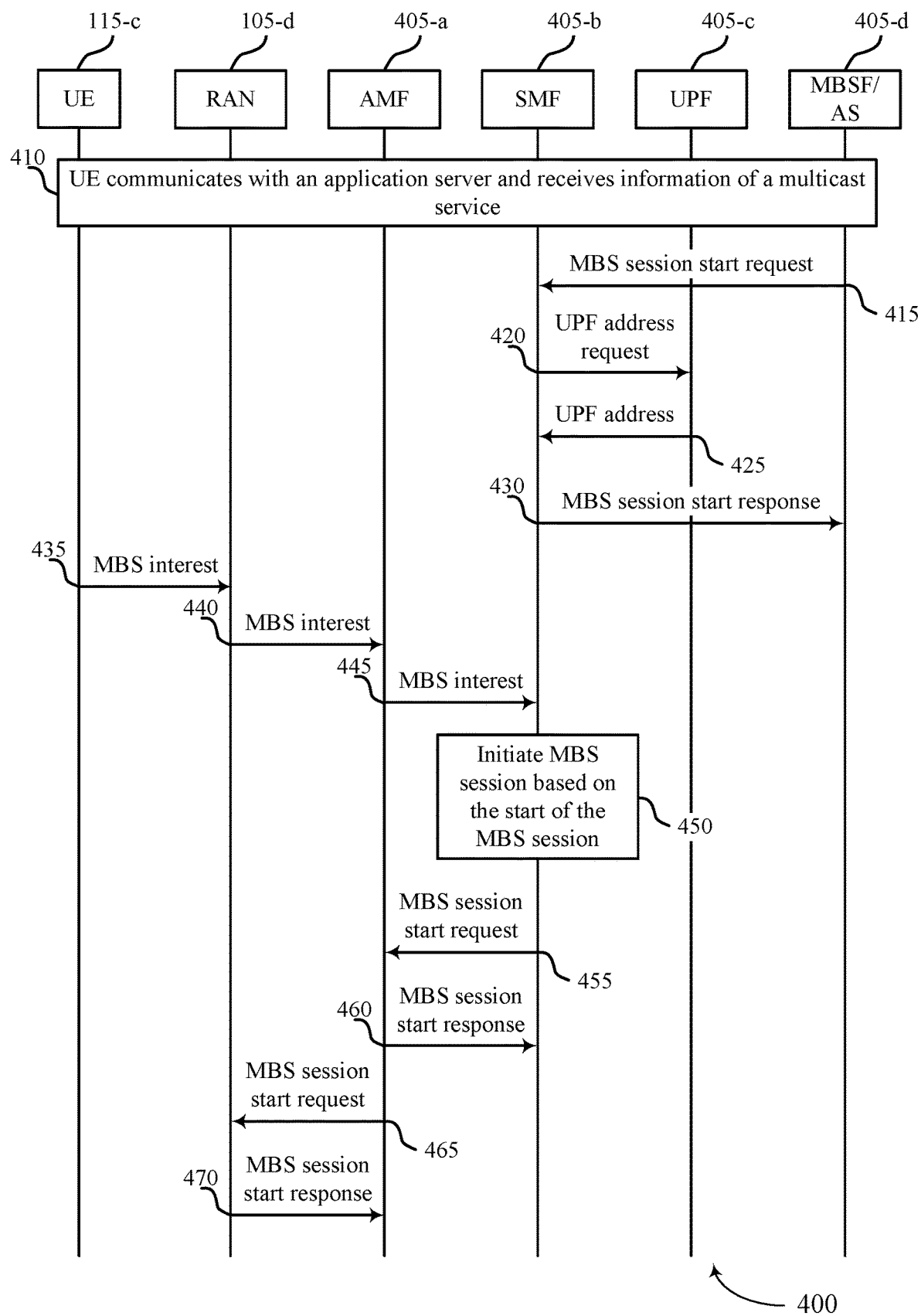

FIG. 4 illustrates an example of a process flow 400 that supports UAI for MBSs in accordance with aspects of the present disclosure. The process flow 400 may illustrate an example multicast communication procedure. For example, UE 115-*c* may configure multicast and/or unicast UAI and transmit the UAI to RAN 105-*d* (e.g., a base station). UE 115-*c* may be an example of the UEs 115 described with reference to FIGS. 1 through 3 and RAN 105-*d* may be an example of the base stations described with reference to FIGS. 1 through 3. In some cases, instead of UE 115-*c* transmitting the UAI, a different type of device (e.g., a base station, one or more functions of the network) may transmit UAI to one or more other devices. Alternative examples of the following may be implemented, where some steps are performed in a different order than described or are not performed at all. In some cases, steps may include additional features not mentioned below, or further steps may be added.

In some implementations, multicast communications may be served by networks of different architectures. A UE 115 may transmit the UAI on one or more layers based on the architecture of the network serving the UE 115. In some cases, the multicast service (e.g., 5G MBS) may be based on or similar to a dedicated multicast function (e.g., dedicated MBS function 5GC). In such an architecture, a UE 115 may transmit a message to the base station 105 providing the multicast service to trigger setup or trigger a release of an MRB. For example, the UE 115 may transmit a multicast service request (e.g., MBMS interest indication) to a base station 105 and the base station 105 may relay the request to the core network to configure multicast flows. After configuration of the multicast flows, the base station 105 may transmit multicast transmissions to the UE 115.

As such, the multicast architecture may include a communication flow for a session request message that flows from the UE 115 to a base station 105 to a core network, where the core network may establish associated MRBs with the UE 115. In some cases, a core network may include one or more functions such as an AMF 405-*a* (e.g., M-AMF), SMF 405-*b* (e.g., MB-SMF), UPF 405-*c* (e.g., MB-UPF), and an MB SF/application server (AS) 405-*d*. In some cases, core network functions 405-*a* through 405-*d* may be dedicated MBS functions. The UE 115 may transmit a multicast service interest to RAN 105-*d* (e.g., NG-RAN, base station) and RAN 105-*d* may relay the interest to one or more functions 405 of the core network. For example, at 410, UE 115-*c* may communicate with an AS and receive information of an available multicast service (e.g., MBS service). At 415, MBSF/AS 405-*d* may transmit an MBS session start request to SMF 405-*b*.

At 420, SMF 405-*b* may transmit a UPF address request to UPF 405-*c*. At 425, UPF 405-*c* may transmit the UPF address associated with UPF 405-*c* to SMF 405-*b*. SMF 405-*b* may request and receive the UPF address of UPF 405-*c* to receive content from MBSF/AS 405-*d*. At 430, SMF 405-*b* may transmit an MBS session start response to MBSF/AS 405-*d*. In some cases, steps 415 through 430 may occur prior to, in parallel with, or after steps 410, 435, 440, and/or 445.

At 435, UE 115-*c* may transmit an MBS interest to RAN 105-*d* (e.g., MBS interest indication) that indicates UE 115-*c* is interested in receiving multicast communications from RAN 105-*d*. In some cases, UE 115-*c* may transmit the MBS interest message to request resources for MBS services. The interest message may indicate a specific multicast service UE 115-*c* has determined to join. The interest message may include UAI for multicast as described with reference to FIG. 2. At 440, RAN 105-*d* may relay the MBS interest to AMF 405-*a*. In some cases, the MBS interest message to AMF 405-*a* may include UAI for multicast communications. For example, if radio resources have not been allocated for the MBS service, RAN 105-*d* may inform AMF 405-*a* of the interest of UE 115-*c* to join a specific MBS service. At 445, AMF 405-*a* may relay the MBS interest to SMF 405-*b*. In some cases, the MBS interest message to SMF 405-*b* may include UAI for multicast communications. For example, if the MBS session has not started in AMF 405-*a*, AMF 405-*a* may transmit a notification to SMF 405-*b* of the interest of UE 115-*c* and RAN 105-*d* to join the MBS service. If the MBS session has started, steps 445 through 460 may be skipped.

At 450, SMF 405-*b* may initiate an MBS session based on the start of the MBS session. For example, if the MBS session has stared, SMF 405-*b* may initiate (e.g., immediately) the MBS sessions toward AMF 405-*a*. If the MBS session has not started. SMF 405-*b* may wait for the MBS session start from MBSF/AS 405-*d*. At 455, SMF 405-*b* may transmit an MBS session start request to AMF 405-*a*. At 460, AMF 405-*a* may transmit an MBS session start response to SMF 405-*b*. At 465, AMF 405-*a* may transmit an MBS session start request to RAN 105-*d*. At 470, RAN 105-*d* may transmit an MBS session start response to AMF 405-*a*.

Figure 5:
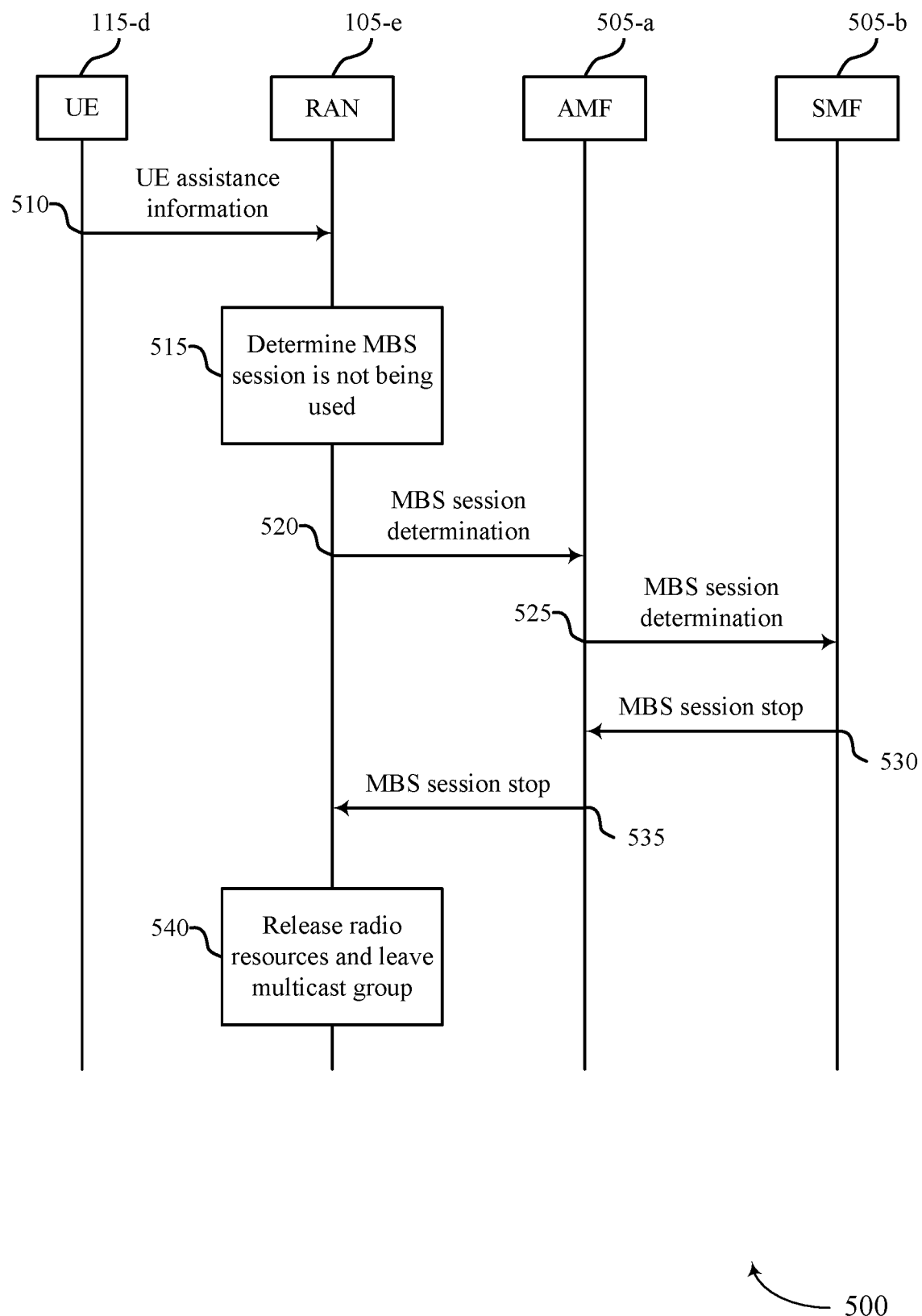

FIG. 5 illustrates an example of a process flow 500 that supports UAI for MBSs in accordance with aspects of the present disclosure. The process flow 500 may illustrate an example multicast communication procedure. For example, UE 115-*d* may configure multicast and/or unicast UAI and transmit the UAI to RAN 105-*e* (e.g., a base station). UE 115-*d* may be an example of the UEs 115 described with reference to FIGS. 1 through 4 and RAN 105-*e* may be an example of the base stations described with reference to FIGS. 1 through 4. In some cases, instead of UE 115-*d* transmitting the UAI, a different type of device (e.g., a base station, one or more functions of the network) may transmit UAI to one or more other devices. Alternative examples of the following may be implemented, where some steps are performed in a different order than described or are not performed at all. In some cases, steps may include additional features not mentioned below, or further steps may be added.

In some implementations, multicast communications may be served by networks of different architectures. A UE 115 may transmit the UAI on one or more layers based on the architecture of the network serving the UE 115. In some cases, the multicast service (e.g., 5G MBS) may be based on or similar to a dedicated multicast function (e.g., dedicated MBS function 5GC). In such an architecture, a UE 115 may transmit a message to the base station 105 providing the multicast service to trigger setup or trigger a release of an MRB.

As such, the multicast architecture may include a communication flow for a session request message that flows from the UE 115 to a base station 105 to a core network, where the core network may establish or release associated MRB with the UE 115. In some cases, a core network may include one or more functions such as an AMF 505-*a* (e.g., M-AMF), and an SMF 505-*b* (e.g., MB-SMF). In some cases, core network functions 505-*a* and 505-*b* may be dedicated MBS functions. The UE 115 may transmit a multicast service interest to RAN 105-*e* (e.g., NG-RAN, base station) and RAN 105-*e* may relay the interest to one or more functions 505 of the core network. In some cases, UE 115-*d* may be receiving multicast transmissions from RAN 105-*e* and UE 115-*d* may determine to cease the multicast service. At 510, UE 115-*d* may transmit a multicast interest message (e.g., MBS interest indication) to RAN 105-*e* that may include UAI for multicast. The interest indication may implicitly or explicitly indicate that UE 115-*d* has determined to cease the multicast service session with RAN 105-*e*. RAN 105-*e* may receive interest indications from multiple UEs 115.

At 515, RAN 105-*e* may determine that the MBS service is not being used by at least UE 115-*d*. The determination may be based on the interest indication received by at least UE 115-*d*. At 520, RAN 105-*e* may transmit an MBS session determination message to AMF 505-*a*. The MBS session determination message may indicate to RAN 105-*e* that there is not a UE 115 within the serving area of RAN 105-*e* that is using the MBS session. The MBS session determination message to AMF 505-*a* may include UAI for multicast. At 525, AMF 505-*a* may relay the MBS session determination message to SMF 505-*b*. The MBS session determination message to SMF 505-*b* may include UAI for multicast. At 530, SMF 505-*b* may transmit an MBS session stop message to AMF 505-*a*. At 535, AMF 505-*a* may relay the MBS session stop message to RAN 105-*e*. At 540, RAN 105-*e* may release radio resources associated with the multicast session and leave the multicast group.

Figure 6:
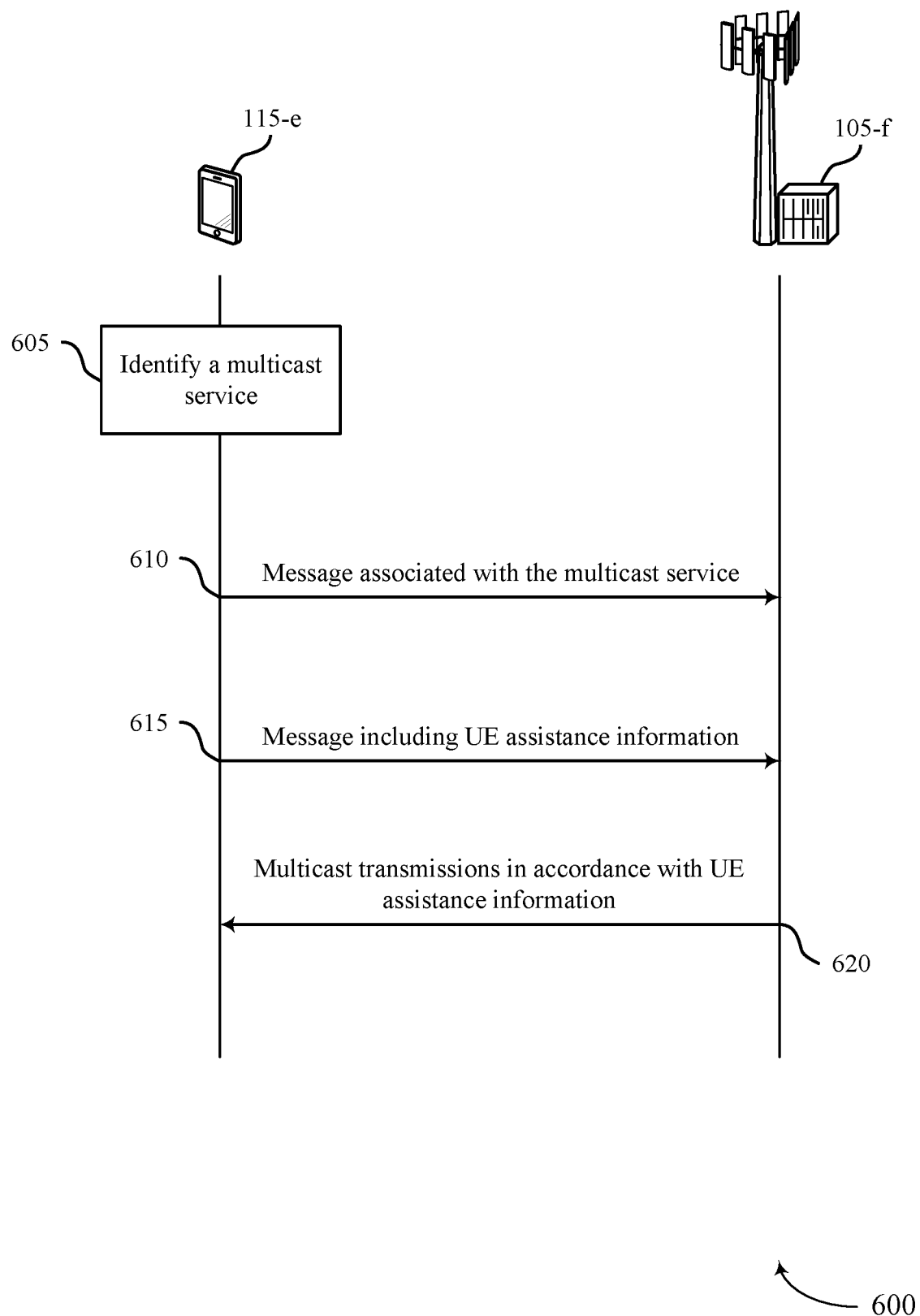

FIG. 6 illustrates an example of a process flow 600 that supports UAI for MBSs in accordance with aspects of the present disclosure. The process flow 600 may illustrate an example multicast communication procedure. For example, UE 115-*e* may configure multicast and/or unicast UAI and transmit the UAI to base station 105-*f*. UE 115-*e* may be an example of the UEs described with reference to FIGS. 1 through 5 and base station 105-*f* may be an example of the base stations described with reference to FIGS. 1 through 5. In some cases, instead of UE 115-*e* transmitting the UAI, a different type of device (e.g., a base station, one or more functions of the network) may transmit UAI to one or more other devices. Alternative examples of the following may be implemented, where some steps are performed in a different order than described or are not performed at all. In some cases, steps may include additional features not mentioned below, or further steps may be added.

At 605, UE 115-*e* may identify a multicast service available for subscription by UE 115-*e* or to which UE 115-*c* is already subscribed. The multicast service may be served by base station 105-*f*.

At 610, UE 115-*e* may transmit, to base station 105-*f*, a message associated with a multicast service. In some cases, the message may indicate a preference of UE 115-*e* to receive multicast transmissions of the multicast service or that UE 115-*e* is already receiving multicast transmissions of the multicast service. In some cases, the message may include UAI.

At 615, UE 115-*e* may transmit, to base station 105-*f*, a message associated with the multicast service. The message may include UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. In some cases, the message transmitted at 615 may be the same message or a different message to the message transmitted at 610. UE 115-*e* may transmit UAI related to multicast transmissions in response to be added to a multicast service, or in response to determining a change in the information included in a previous UAI transmission, or a combination thereof.

The feedback scheme preference may include an indication of at least one of a first feedback scheme associated with transmission of both NACK and ACK feedback, a second feedback scheme associated with transmission of group NACK feedback, or a third feedback scheme associated with transmission of no feedback. The measurement and reporting scheme preference may include an indication of at least one of a first measurement and reporting scheme associated with L1 measurement and reporting (e.g., reporting based on L1-RSRP, L1-RSRQ, or L1-SINR, or a combination thereof) or a second measurement and reporting scheme associated with L3 measurement and reporting (e.g., reporting based on L3-RSRP, L3-RSRQ, or L3-SINR, or a combination thereof with indicated L3 filtering). The UE capability to process the multicast transmissions may include an indication of at least one of a number of resources (e.g., CORESETs) UE 115-e supports for multicast communications, a bandwidth UE 115-e supports for multicast transmissions, or a UE capability type of UE 115-e. The UAI may also include at least one of a carrier preference for the multicast service, or a band or carrier measurement report.

In some implementations, UE 115-e may transmit the UAI in one or more layers based on a multicast architecture of a network providing the multicast service. For example, the multicast architecture may include a communication flow for the message that flows from UE 115-e to a core network to base station 105-f, where base station 105-f establishes associated MRBs with UE 115-e. In such an example, UE 115-e may transmit the message with the UAI in a PDU session establishment message, a PDU session modification message, or a release request message. In another example, the multicast architecture includes a communication flow for the message that flows from UE 115-e to base station 105-f to a core network, where the core network establishes associated MRBs with UE 115-e. In such an example, UE 115-e may transmit the message with the UAI in a multicast broadcast service interest indication.

At 620, UE 115-e may receive, from base station 105-f, the multicast transmissions in accordance with the UAI. UE 115-e may receive the multicast transmissions from a serving cell (e.g., base station 105-f) that also provides unicast transmissions to UE 115-e. UE 115-e may identify that UE 115-e receives unicast transmissions from a reserved cell (e.g., a base station 105) that is different from the cell (e.g., base station 105-f) that is transmitting the multicast transmissions. UE 115-e may transmit second UAI to the reserved cell, where the second UAI includes one or more of a carrier or BWP preference for a unicast service, a unicast processing capability, a timing preference for the unicast service, or a power preference for the unicast service. The unicast processing capability may include an indication of a least one of a number of resources (e.g., CORESETs) UE 115-e supports for unicast communications, or a UE capability type of UE 115-e.

In some cases, UE 115-c may receive the multicast transmissions while UE 115-e is in an idle or inactive mode, and UE 115-e may determine to switch modes from the idle or inactive mode to a connected mode based on a QoS preference of UE 115-e. UE 115-c may transmit the message with the UAI during RRC connection establishment of a RACH procedure based on the determination to switch modes from the idle or inactive mode to the connected mode. The message with the UAI may be included in a RACH procedure msg3 or RACH procedure msg5.

In some cases, UE 115-c may receive the multicast transmissions while UE 115-e is in a connected mode, and UE 115-c may determine to switch modes from the connected mode to an idle or inactive mode based on a power consumption preference of the UE. UE 115-c may transmit the message with the UAI prior to switching from the connected mode to the idle mode, and switch from the connected mode to the idle mode or the inactive mode.

Figure 7:
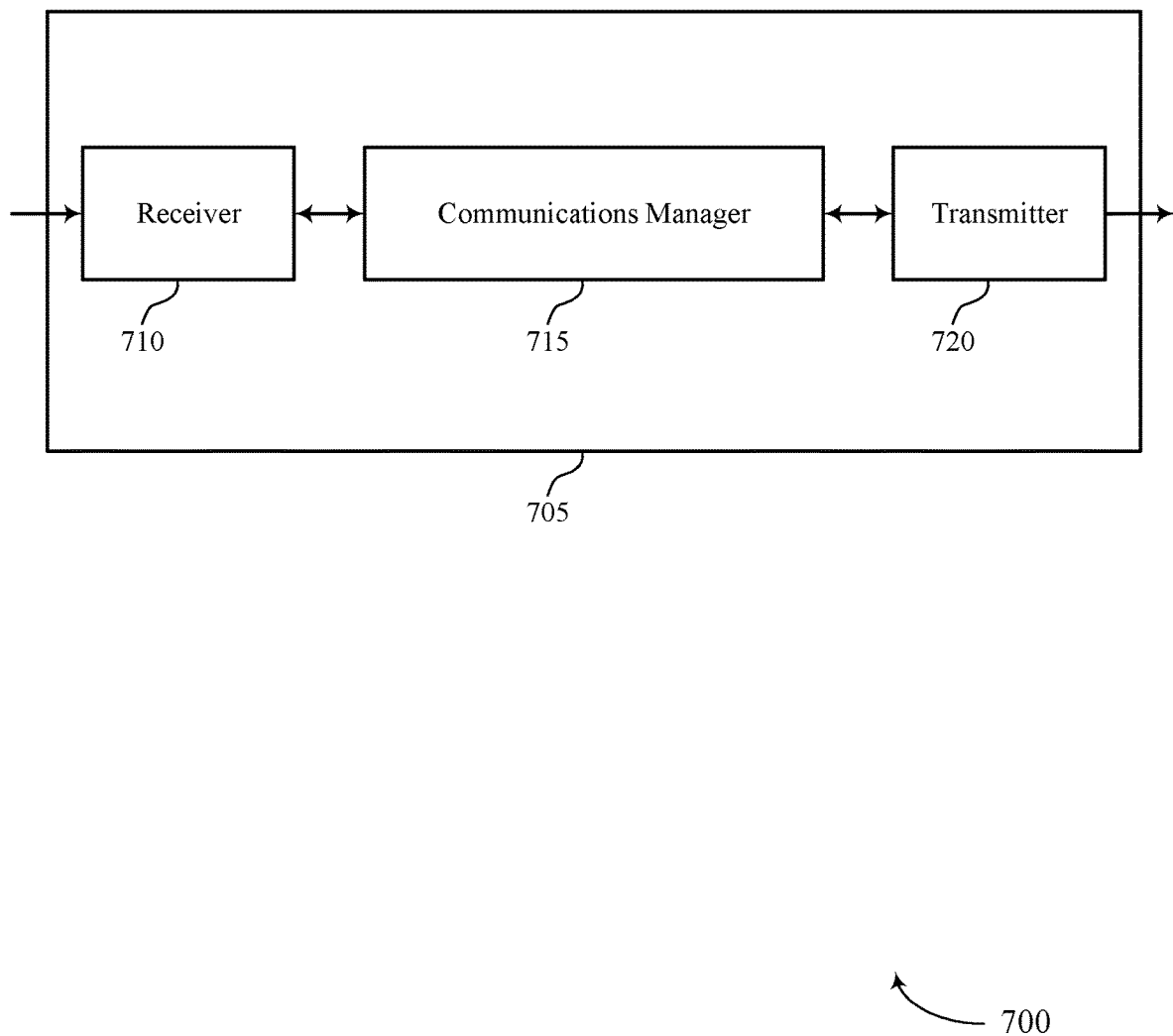
FIGS. 7 and 8 show block diagrams of devices that support UAI for MBSs in accordance with aspects of the present disclosure.

FIG. 7 shows a block diagram 700 of a device 705 that supports UAI for MBSs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to UAI for MBSs, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a multicast service available for subscription by the UE or to which the UE is already subscribed, transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receive the multicast transmissions in accordance with the UAI. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The communications manager 715 as described herein may be implemented to realize one or more potential advantages. One implementation may allow the device 705 to more efficiently receiving multicast transmissions from one or more base stations. For example, a device 705 may dynamically transmit UAI to one or more base stations providing multicast services to the device 705 to update or request multicast services.

Based on implementing the UAI transmission techniques for multicast communications as described herein, a processor of a UE 115 (e.g., controlling the receiver 710, the transmitter 720, or the transceiver 1020 as described with reference to FIG. 10) may increase reliability and efficiency in the communication multicast messages between a UE 115 and one or more base stations.

By including or configuring the communications manager 715 in accordance with examples as described herein, the device 705 (e.g., a processor controlling or otherwise coupled to the receiver 710, the transmitter 720, the communications manager 715, or a combination thereof) may support techniques for reduced processing, reduced power consumption, and more efficient utilization of communication resources.

Figure 8:
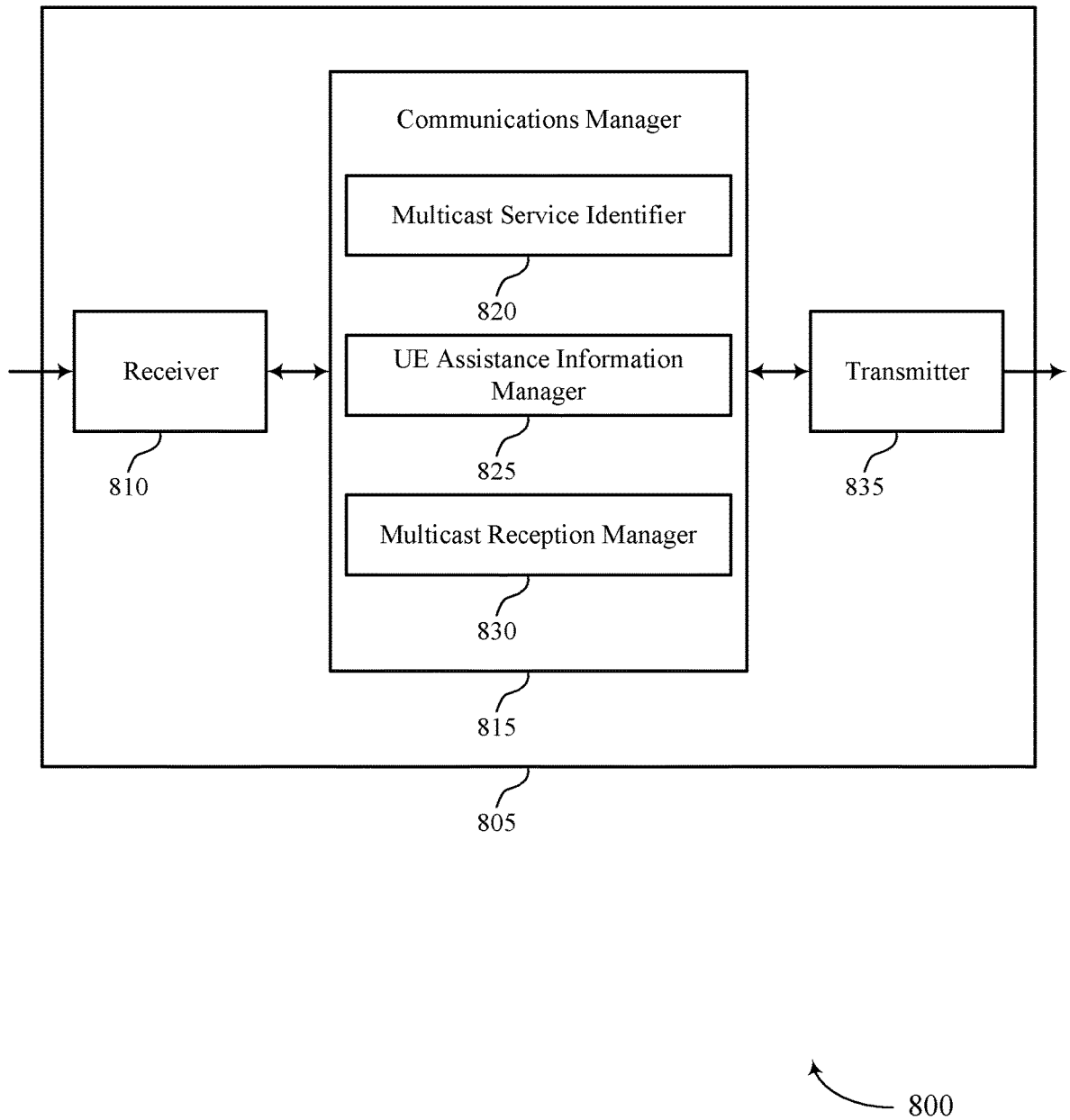

FIG. 8 shows a block diagram 800 of a device 805 that supports UAI for MBSs in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to UAI for MBSs, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a multicast service identifier 820, an UAI manager 825, and a multicast reception manager 830. The communications manager 815 may be an example of aspects of the communications manager 1010 described herein.

The multicast service identifier 820 may identify a multicast service available for subscription by the UE or to which the UE is already subscribed. The UAI manager 825 may transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The multicast reception manager 830 may receive the multicast transmissions in accordance with the UAI.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
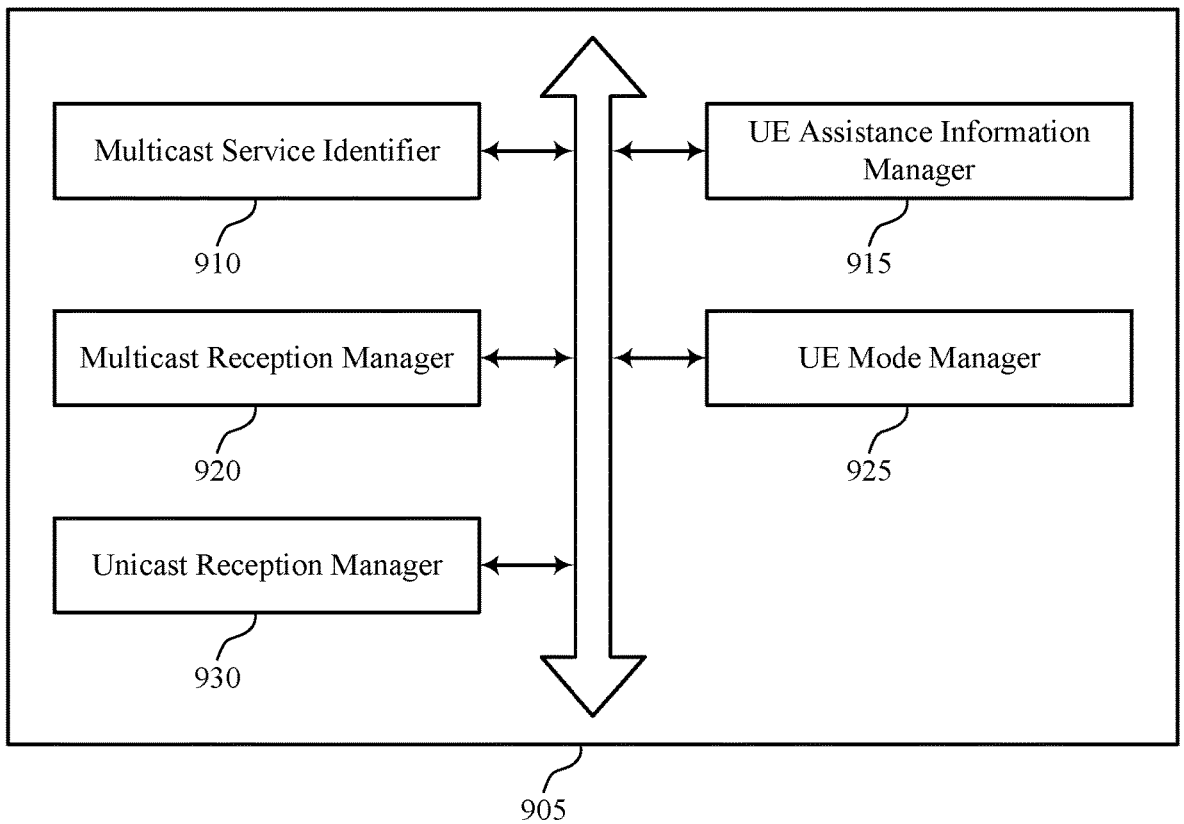
FIG. 9 shows a block diagram of a communications manager that supports UAI for MBSs in accordance with aspects of the present disclosure.

FIG. 9 shows a block diagram 900 of a communications manager 905 that supports UAI for MBSs in accordance with aspects of the present disclosure. The communications manager 905 may be an example of aspects of a communications manager 715, a communications manager 815, or a communications manager 1010 described herein. The communications manager 905 may include a multicast service identifier 910, an UAI manager 915, a multicast reception manager 920, a UE mode manager 925, and a unicast reception manager 930. Each of these modules may communicate, directly or indirectly, with one another (e.g., via one or more buses).

The multicast service identifier 910 may identify a multicast service available for subscription by the UE or to which the UE is already subscribed. The UAI manager 915 may transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The multicast reception manager 920 may receive the multicast transmissions in accordance with the UAI.

In some examples, the UAI manager 915 may include in the UAI, as the feedback scheme preference, an indication of at least one of a first feedback scheme associated with transmission of both ACK and NACK feedback, a second feedback scheme associated with transmission of group NACK feedback, or a third feedback scheme associated with transmission of no feedback. In some examples, the UAI manager 915 may include in the UAI, as the measurement and reporting scheme preference, an indication of at least one of a first measurement and reporting scheme associated with L1 measurement and reporting, or a second measurement and reporting scheme associated with L3 measurement and reporting. In some examples, the UAI manager 915 may include in the UAI, as the UE capability to process the multicast transmissions, an indication of at least one of a number of CORESETs the UE supports for multicast communications, a bandwidth the UE supports for multicast transmissions, or a UE capability type. In some examples, the UAI manager 915 may include in the UAI at least one of a carrier preference for the multicast service, or a band or carrier measurement report.

In some examples, the UAI manager 915 may transmit the UAI in one or more layers based on a multicast architecture of a network providing the multicast service. In some cases, the multicast architecture includes a communication flow for the message that flows from the UE to a core network to a base station, where the base station establishes associated MRBs with the UE. In some examples, the UAI manager 915 may transmit the message with the UAI in a PDU session establishment message, a PDU session modification message, or a release request message. In some cases, the multicast architecture includes a communication flow for the message that flows from the UE to a base station to a core network, where the core network establishes associated MRBs with the UE. In some examples, the UAI manager 915 may transmit the message with the UAI in a multicast broadcast service interest indication.

In some examples, the multicast reception manager 920 may receive the multicast transmissions while the UE is in an idle mode or an inactive mode. The UE mode manager 925 may determine to switch modes from the idle mode or the inactive mode to a connected mode based on a quality of service preference of the UE. In some examples, the UAI manager 915 may transmit the message with the UAI during RRC connection establishment of a RACH procedure based on the determination to switch modes from the idle mode or the inactive mode to the connected mode. In some cases, the message with the UAI is included in a RACH procedure msg3 or RACH procedure msg5.

In some examples, the multicast reception manager 920 may receive the multicast transmissions while the UE is in a connected mode. In some examples, the UE mode manager 925 may determine to switch modes from the connected mode to an idle mode or an inactive mode based on a power consumption preference of the UE. In some examples, the UAI manager 915 may transmit the message with the UAI prior to switching from the connected mode to the idle mode or the inactive mode.

In some examples, the multicast reception manager 920 may receive the multicast transmissions from a serving cell that also provides unicast transmissions to the UE. The unicast reception manager 930 may identify that the UE receives unicast transmissions from a reserved cell that is different from the cell that is transmitting the multicast transmissions. The unicast reception manager 930 may transmit second UAI to the reserved cell, where the second UAI includes one or more of a carrier or BWP preference for a unicast service, a unicast processing capability, a timing preference for the unicast service, or a power preference for the unicast service, the unicast processing capability including an indication of a least one of a number of control resources set the UE supports for unicast communications, or a UE capability type.

Figure 10:
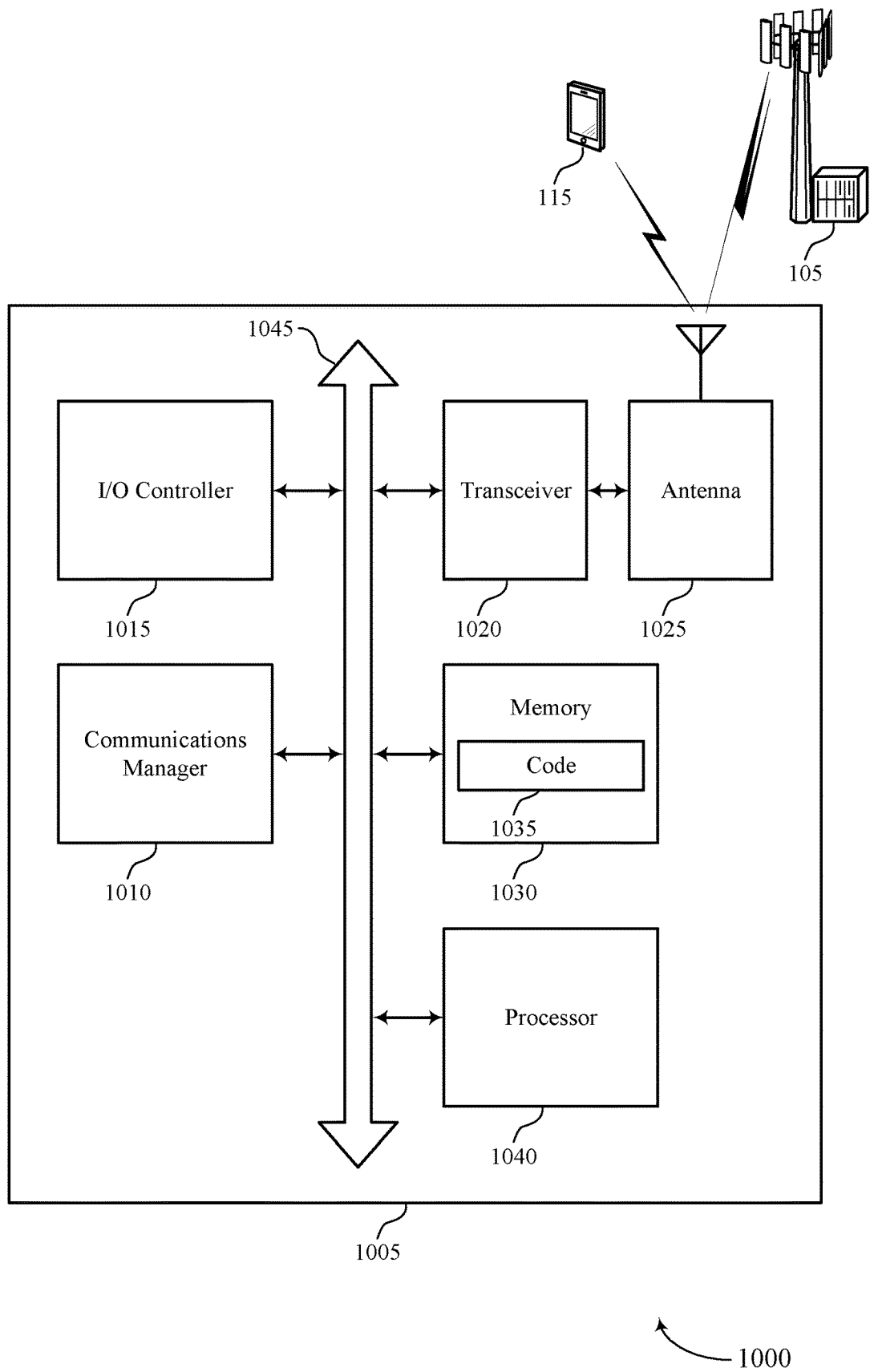
FIG. 10 shows a diagram of a system including a device that supports UAI for MBSs in accordance with aspects of the present disclosure.

FIG. 10 shows a diagram of a system 1000 including a device 1005 that supports UAI for MBSs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a multicast service available for subscription by the UE or to which the UE is already subscribed, transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and receive the multicast transmissions in accordance with the UAI.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UAI for MBSs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

By including or configuring the communications manager 1010 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

Figure 11:
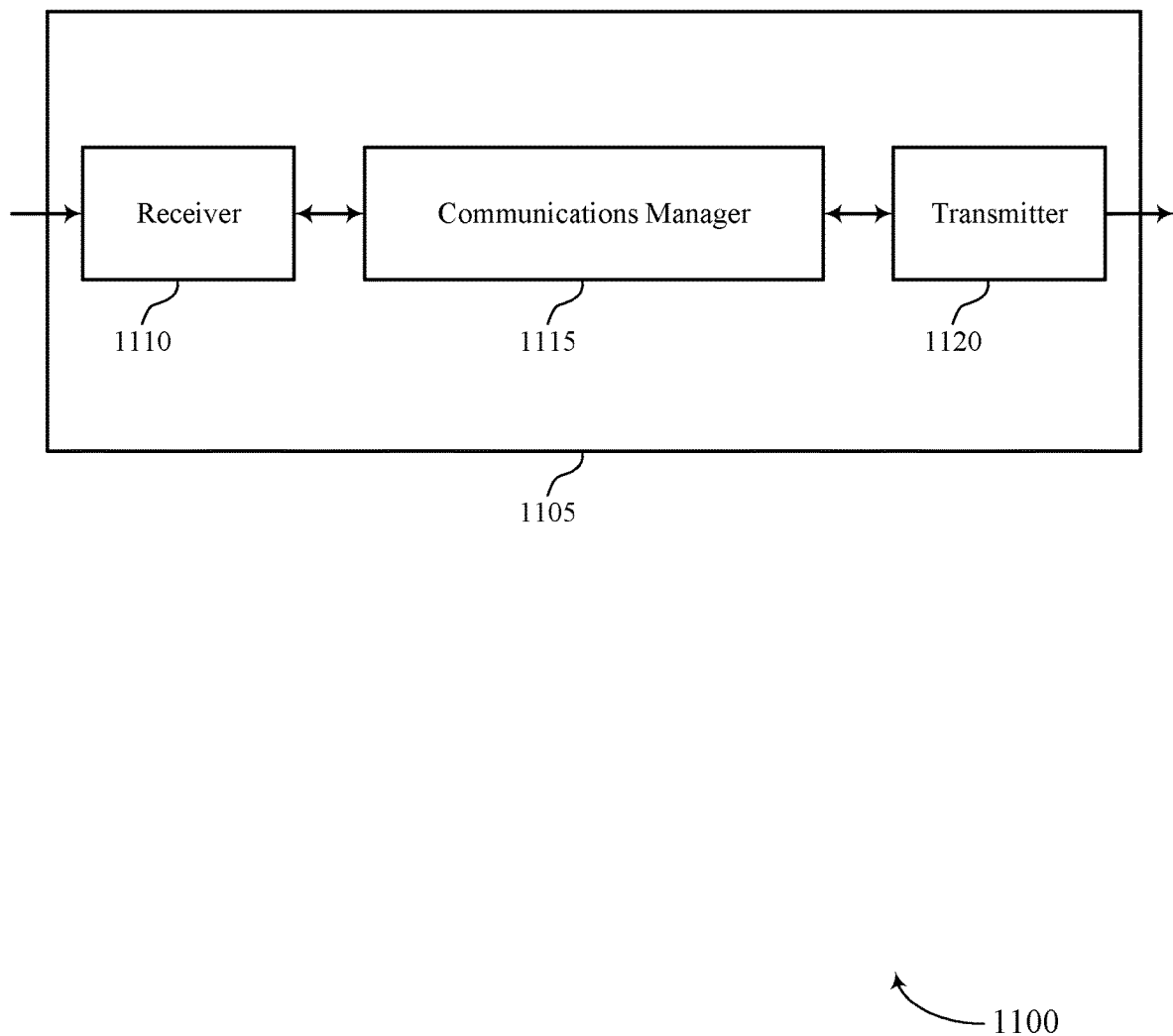
FIGS. 11 and 12 show block diagrams of devices that support UAI for MBSs in accordance with aspects of the present disclosure.

FIG. 11 shows a block diagram 1100 of a device 1105 that supports UAI for MBSs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to UAI for MBSs, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE, a message associated with a multicast service, receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicate with the UE in accordance with the UAI. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communications manager 1115 in accordance with examples as described herein, the device 1105 (e.g., a processor controlling or otherwise coupled to the receiver 1110, the transmitter 1120, the communications manager 1115, or a combination thereof) may support techniques for reduced processing, reduced power consumption, and more efficient utilization of communication resources.

Figure 12:
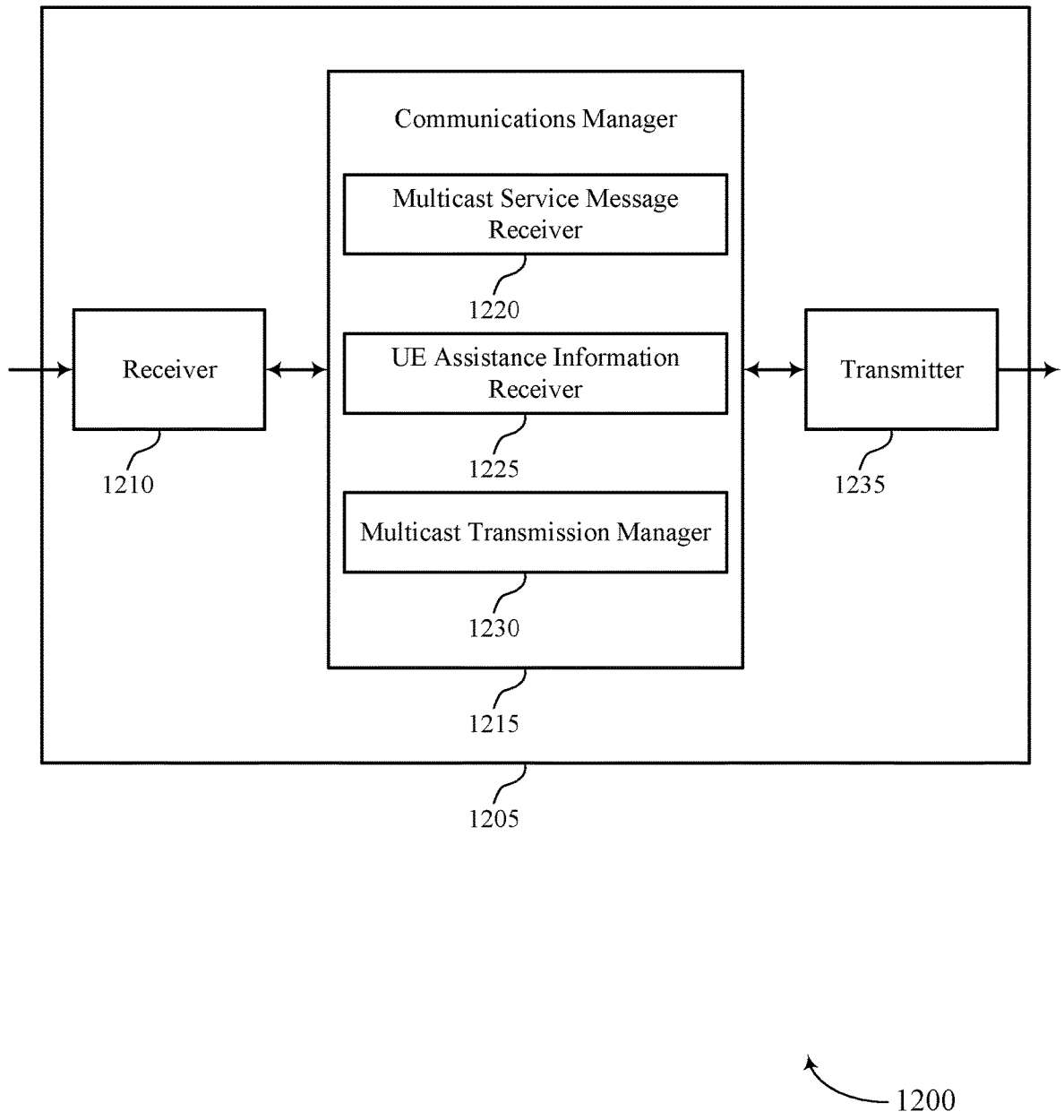

FIG. 12 shows a block diagram 1200 of a device 1205 that supports UAI for MBSs in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to UAI for MBSs, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a multicast service message receiver 1220, an UAI receiver 1225, and a multicast transmission manager 1230. The communications manager 1215 may be an example of aspects of the communications manager 1410 described herein.

The multicast service message receiver 1220 may receive, from a UE, a message associated with a multicast service. The UAI receiver 1225 may receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The multicast transmission manager 1230 may communicate with the UE in accordance with the UAI.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
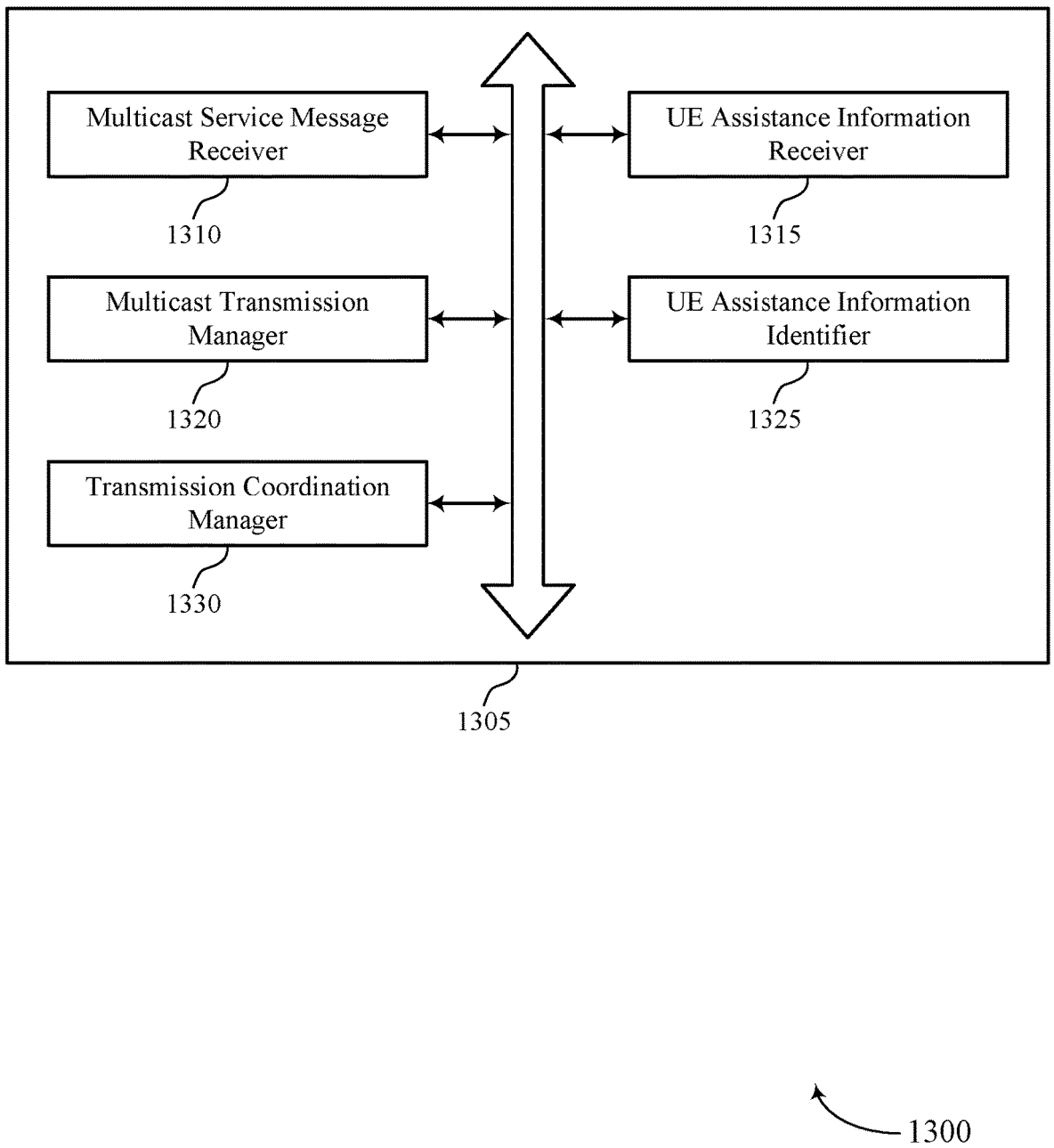
FIG. 13 shows a block diagram of a communications manager that supports UAI for MBSs in accordance with aspects of the present disclosure.

FIG. 13 shows a block diagram 1300 of a communications manager 1305 that supports UAI for MBSs in accordance with aspects of the present disclosure. The communications manager 1305 may be an example of aspects of a communications manager 1115, a communications manager 1215, or a communications manager 1410 described herein. The communications manager 1305 may include a multicast service message receiver 1310, an UAI receiver 1315, a multicast transmission manager 1320, an UAI identifier 1325, and a transmission coordination manager 1330. Each of these modules may communicate, directly or indirectly, with one another (e.g., via one or more buses).

The multicast service message receiver 1310 may receive, from a UE, a message associated with a multicast service. The UAI receiver 1315 may receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The multicast transmission manager 1320 may communicate with the UE in accordance with the UAI.

In some cases, the network node is a core network node that transmits multicast transmissions to the UE in accordance with the UAI. The UAI identifier 1325 may identify in the UAI, as the feedback scheme preference, an indication of at least one of a first feedback scheme associated with transmission of both ACK and NACK feedback, a second feedback scheme associated with transmission of group NACK feedback, or a third feedback scheme associated with transmission of no feedback. In some examples, the UAI identifier 1325 may identify in the UAI, as the measurement and reporting scheme preference, an indication of at least one of a first measurement and reporting scheme associated with L1 measurement and reporting, or a second measurement and reporting scheme associated with L3 measurement and reporting. In some examples, the UAI identifier 1325 may identify in the UAI, as the UE capability to process the multicast transmissions, an indication of at least one of a number of CORESETs the UE supports for multicast communications, a bandwidth the UE supports for multicast transmissions, or a UE capability type. In some examples, the UAI identifier 1325 may identify in the UAI at least one or a carrier preference for the multicast service, or a band or carrier measurement report.

In some examples, the UAI receiver 1315 may receive the UAI in one or more layers based on a multicast architecture of a network providing the multicast service. In some cases, the network node is a core network node and the multicast architecture includes a communication flow for the message that flows from the UE to the core network node to a base station, where the base station establishes associated MRBs with the UE. In some examples, the UAI receiver 1315 may receive the message with the UAI in a PDU session establishment message, a PDU session modification message, or a release request message. In some cases, the network node is a base station and the multicast architecture includes a communication flow for the message that flows from the UE to the base station to a core network, where the core network establishes associated MRBs with the UE. In some examples, the UAI receiver 1315 may receive the message with the UAI in a multicast broadcast service interest indication.

In some examples, the multicast transmission manager 1320 may transmit the multicast transmissions while the UE is in an idle mode or an inactive mode. In some examples, the UAI receiver 1315 may receive the message with the UAI during RRC connection establishment of a RACH procedure based on a determination by the UE to switch modes from the idle mode or the inactive mode to a connected mode. In some cases, the message with the UAI is included in a RACH procedure msg3 or RACH msg5.

In some examples, the multicast transmission manager 1320 may transmit the multicast transmissions while the UE is in a connected mode. In some examples, the UAI receiver 1315 may receive the message with the UAI prior to the UE switching from the connected mode to an idle mode or an inactive mode.

In some cases, the network node transmits both the multicast transmissions to the UE and unicast transmissions to the UE. In some cases, the network node is a serving cell serving the multicast transmissions. The transmission coordination manager 1330 may coordinate the multicast transmissions with one or more unicast transmissions transmitted by one or more other serving cells serving unicast transmissions, where the multicast transmissions and the one or more unicast transmissions are coordinated via TDA or FDA on a X2 or Xn interface.

Figure 14:
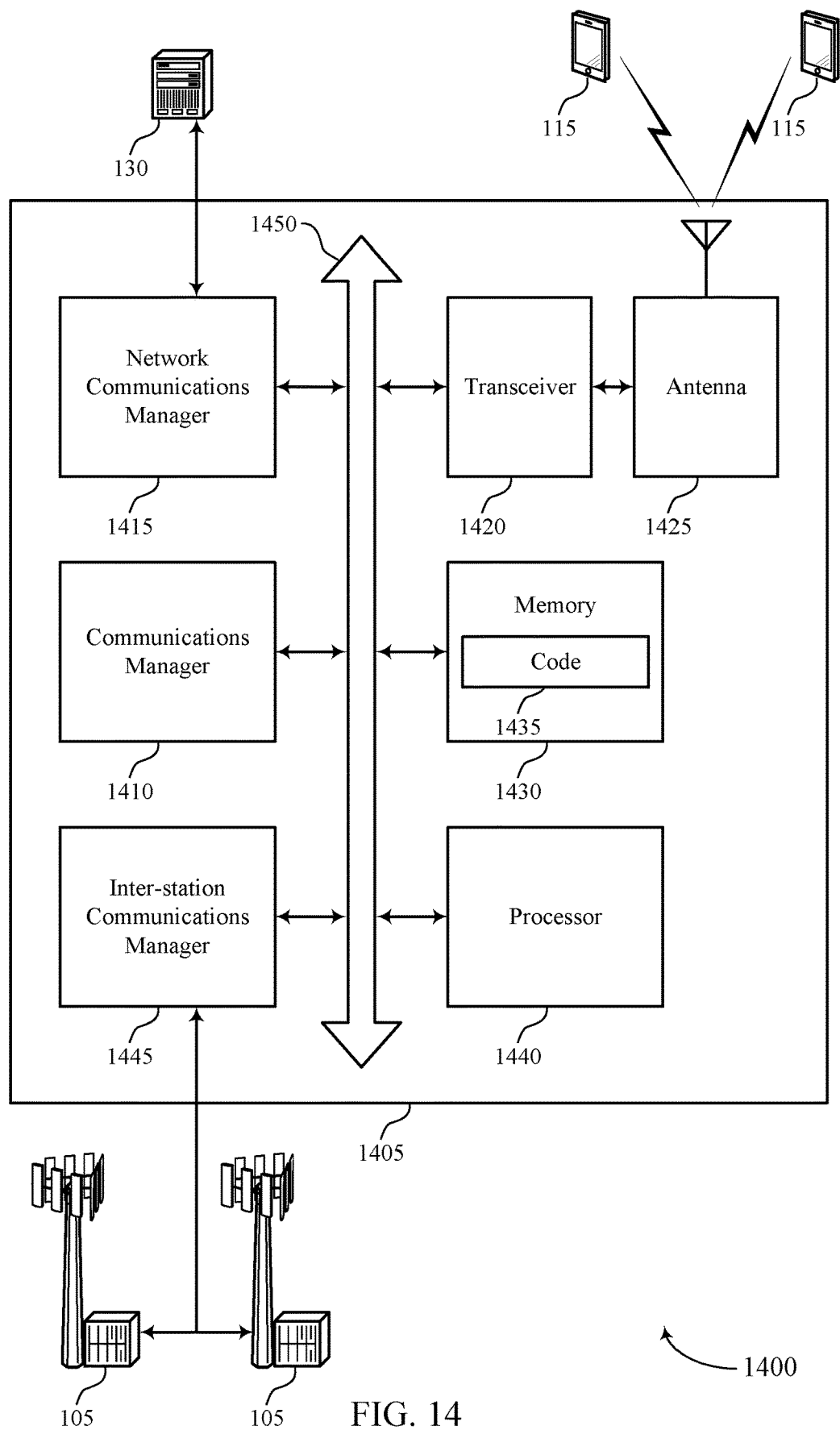
FIG. 14 shows a diagram of a system including a device that supports UAI for MBSs in accordance with aspects of the present disclosure.

FIG. 14 shows a diagram of a system 1400 including a device 1405 that supports UAI for MBSs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE, a message associated with a multicast service, receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions, and communicate with the UE in accordance with the UAI.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting UAI for MBSs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

By including or configuring the communications manager 1410 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

Figure 15:
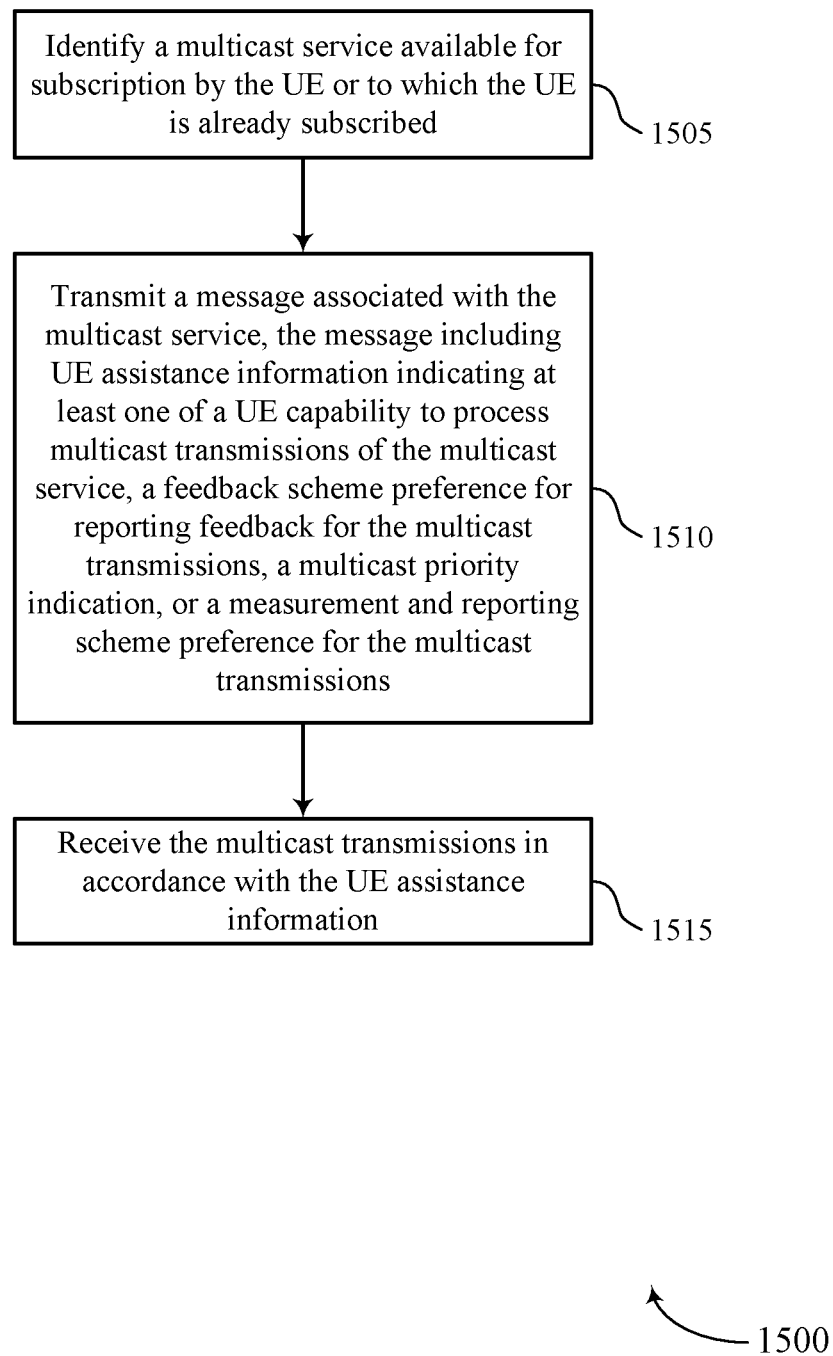
FIGS. 15 through 18 show flowcharts illustrating methods that support UAI for MBSs in accordance with aspects of the present disclosure.

FIG. 15 shows a flowchart illustrating a method 1500 that supports UAI for MBSs in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a multicast service available for subscription by the UE or to which the UE is already subscribed. The operations of 1505 may be performed according to the methods described herein. In some examples, aspects of the operations of 1505 may be performed by a multicast service identifier as described with reference to FIGS. 7 through 10.

At 1510, the UE may transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The operations of 1510 may be performed according to the methods described herein. In some examples, aspects of the operations of 1510 may be performed by an UAI manager as described with reference to FIGS. 7 through 10.

At 1515, the UE may receive the multicast transmissions in accordance with the UAI. The operations of 1515 may be performed according to the methods described herein. In some examples, aspects of the operations of 1515 may be performed by a multicast reception manager as described with reference to FIGS. 7 through 10.

Figure 16:
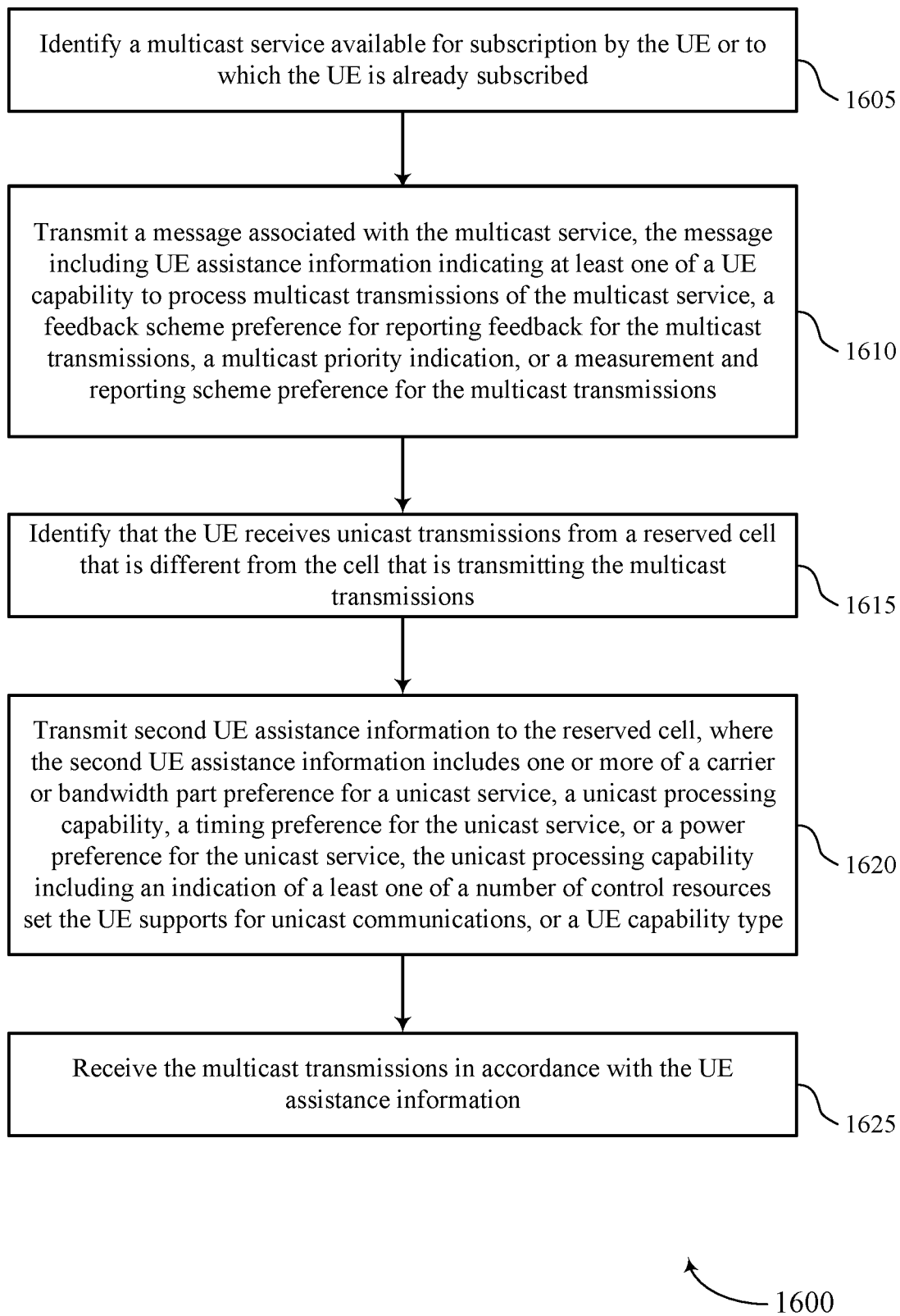

FIG. 16 shows a flowchart illustrating a method 1600 that supports UAI for MBSs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify a multicast service available for subscription by the UE or to which the UE is already subscribed. The operations of 1605 may be performed according to the methods described herein. In some examples, aspects of the operations of 1605 may be performed by a multicast service identifier as described with reference to FIGS. 7 through 10.

At 1610, the UE may transmit a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The operations of 1610 may be performed according to the methods described herein. In some examples, aspects of the operations of 1610 may be performed by an UAI manager as described with reference to FIGS. 7 through 10.

At 1615, the UE may identify that the UE receives unicast transmissions from a reserved cell that is different from the cell that is transmitting the multicast transmissions. The operations of 1615 may be performed according to the methods described herein. In some examples, aspects of the operations of 1615 may be performed by a unicast reception manager as described with reference to FIGS. 7 through 10.

At 1620, the UE may transmit second UAI to the reserved cell, where the second UAI includes one or more of a carrier or BWP preference for a unicast service, a unicast processing capability, a timing preference for the unicast service, or a power preference for the unicast service, the unicast processing capability including an indication of a least one of a number of control resources set the UE supports for unicast communications, or a UE capability type. The operations of 1620 may be performed according to the methods described herein. In some examples, aspects of the operations of 1620 may be performed by an UAI manager as described with reference to FIGS. 7 through 10.

At 1625, the UE may receive the multicast transmissions in accordance with the UAI. The operations of 1625 may be performed according to the methods described herein. In some examples, aspects of the operations of 1625 may be performed by a multicast reception manager as described with reference to FIGS. 7 through 10.

Figure 17:
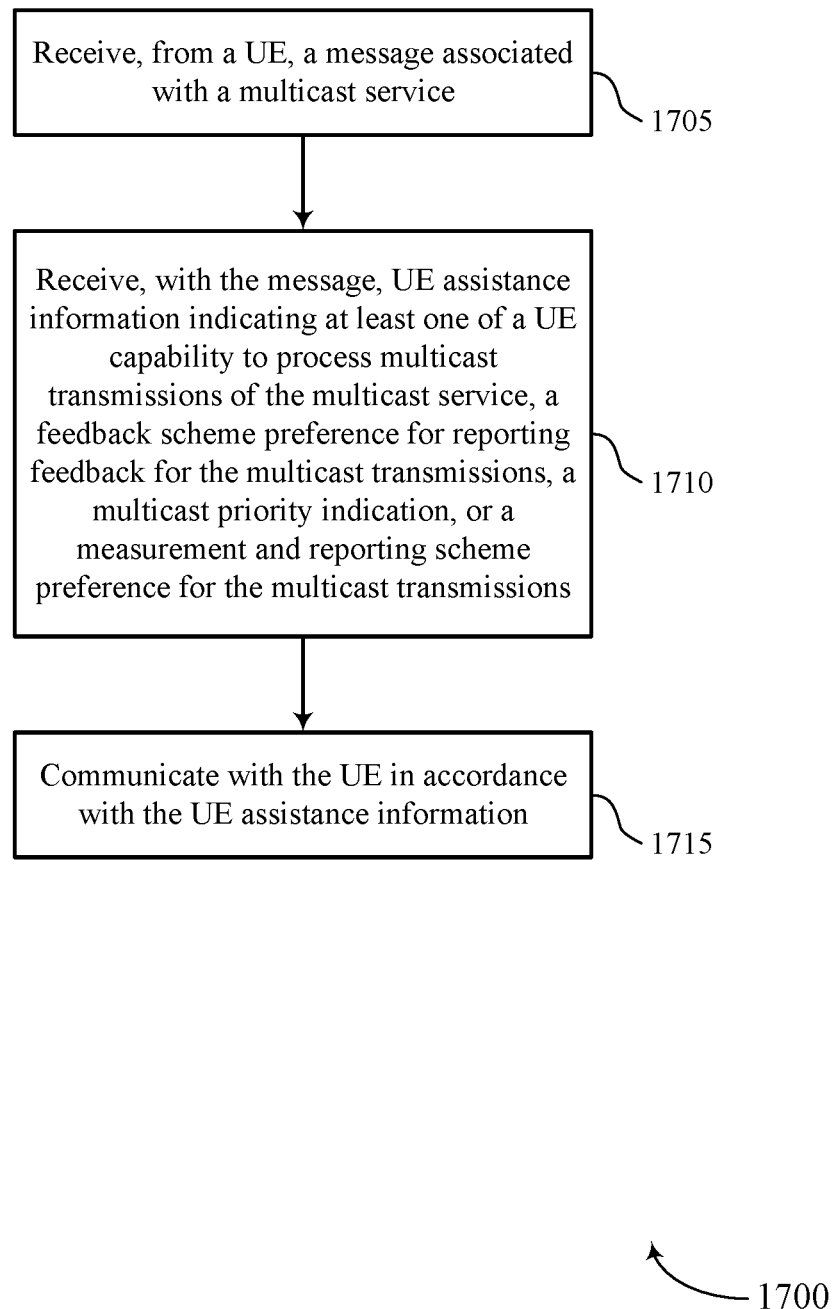

FIG. 17 shows a flowchart illustrating a method 1700 that supports UAI for MBSs in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a message associated with a multicast service. The operations of 1705 may be performed according to the methods described herein. In some examples, aspects of the operations of 1705 may be performed by a multicast service message receiver as described with reference to FIGS. 11 through 14.

At 1710, the base station may receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The operations of 1710 may be performed according to the methods described herein. In some examples, aspects of the operations of 1710 may be performed by an UAI receiver as described with reference to FIGS. 11 through 14.

At 1715, the base station may communicate with the UE in accordance with the UAI. The operations of 1715 may be performed according to the methods described herein. In some examples, aspects of the operations of 1715 may be performed by a multicast transmission manager as described with reference to FIGS. 11 through 14.

Figure 18:
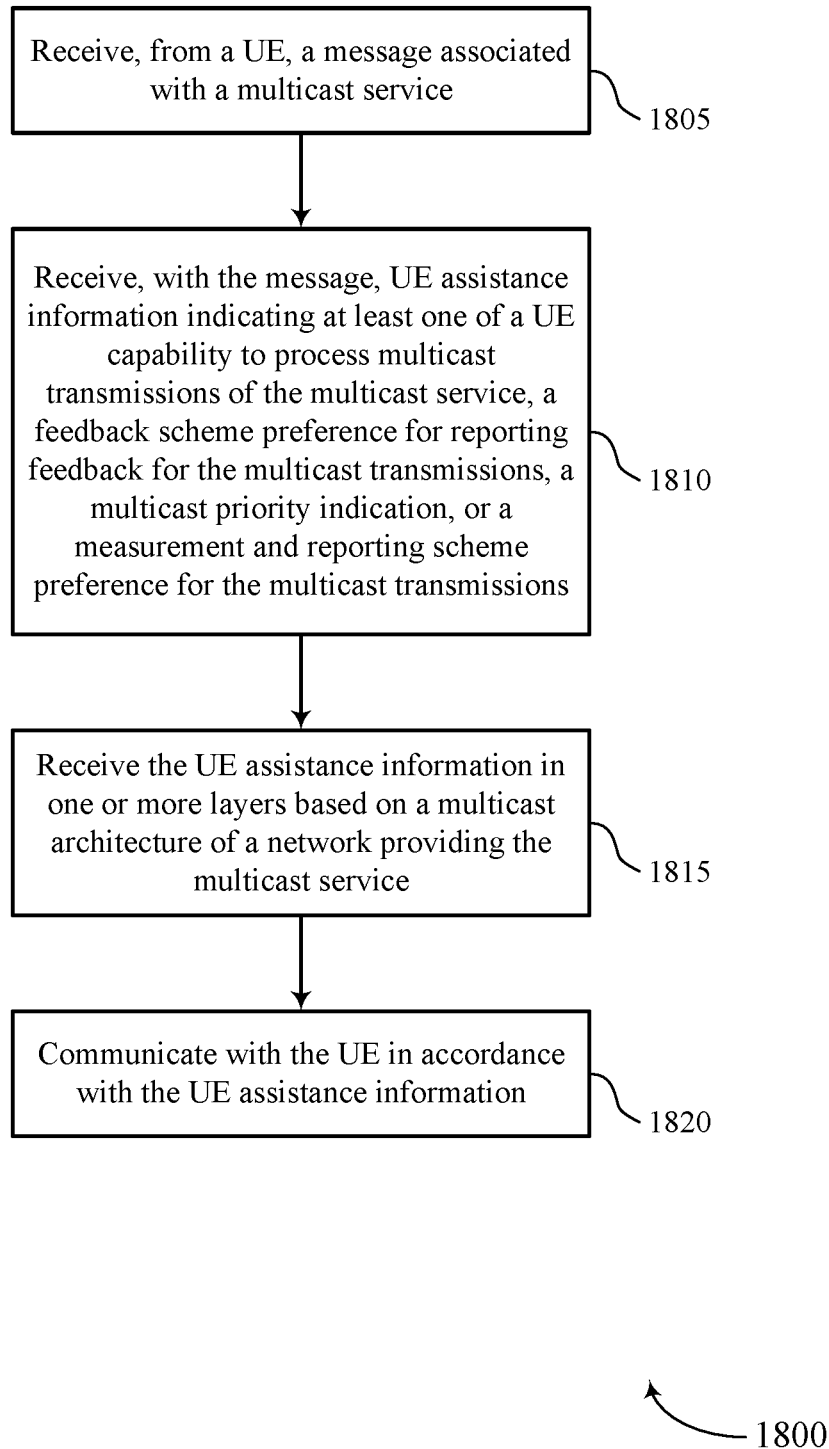

FIG. 18 shows a flowchart illustrating a method 1800 that supports UAI for MBSs in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a message associated with a multicast service. The operations of 1805 may be performed according to the methods described herein. In some examples, aspects of the operations of 1805 may be performed by a multicast service message receiver as described with reference to FIGS. 11 through 14.

At 1810, the base station may receive, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions. The operations of 1810 may be performed according to the methods described herein. In some examples, aspects of the operations of 1810 may be performed by an UAI receiver as described with reference to FIGS. 11 through 14.

At 1815, the base station may receive the UAI in one or more layers based on a multicast architecture of a network providing the multicast service. The operations of 1815 may be performed according to the methods described herein. In some examples, aspects of the operations of 1815 may be performed by an UAI receiver as described with reference to FIGS. 11 through 14.

At 1820, the base station may communicate with the UE in accordance with the UAI. The operations of 1820 may be performed according to the methods described herein. In some examples, aspects of the operations of 1820 may be performed by a multicast transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a user equipment (UE), comprising: identifying a multicast service available for subscription by the UE or to which the UE is already subscribed; transmitting a message associated with the multicast service, the message including UAI indicating at least one of a UE capability to process multicast transmissions of the multicast service, a feedback scheme preference for reporting feedback for the multicast transmissions, a multicast priority indication, or a measurement and reporting scheme preference for the multicast transmissions; and receiving the multicast transmissions in accordance with the UAI.

Aspect 2: The method of aspect 1, further comprising: including in the UAI, as the feedback scheme preference, an indication of at least one of a first feedback scheme associated with transmission of both ACK and NACK feedback, a second feedback scheme associated with transmission of group NACK feedback, or a third feedback scheme associated with transmission of no feedback.

Aspect 3: The method of any of aspects 1 or 2, further comprising: including in the UAI, as the measurement and reporting scheme preference, an indication of at least one of a first measurement and reporting scheme associated with layer one measurement and reporting, or a second measurement and reporting scheme associated with layer three measurement and reporting.

Aspect 4: The method of any of aspects 1 through 3, further comprising: including in the UAI, as the UE capability to process the multicast transmissions, an indication of at least one of a number of control resource sets the UE supports for multicast communications, a bandwidth the UE supports for multicast transmissions, or a UE capability type.

Aspect 5: The method of any of aspects 1 through 4, including in the UAI at least one of a carrier preference for the multicast service, or a band or carrier measurement report.

Aspect 6: The method of any of aspects 1 through 5, wherein transmitting the message with the UAI comprises: transmitting the UAI in one or more layers based at least in part on a multicast architecture of a network providing the multicast service.

Aspect 7: The method of aspect 6, wherein the multicast architecture comprises a communication flow for the message that flows from the UE to a core network to a base station, wherein the base station establishes associated multicast radio bearers with the UE.

Aspect 8: The method of aspect 7, wherein transmitting the message with the UAI further comprises: transmitting the message with the UAI in a protocol data unit session establishment message, a protocol data unit session modification message, or a release request message.

Aspect 9: The method of any of aspects 6 through 8, wherein the multicast architecture comprises a communication flow for the message that flows from the UE to a base station to a core network, wherein the core network establishes associated multicast radio bearers with the UE.

Aspect 10: The method of aspect 9, wherein transmitting the message with the UAI further comprises: transmitting the message with the UAI in a multicast broadcast service interest indication.

Aspect 11: The method of any of aspects 1 through 10, receiving the multicast transmissions while the UE is in an idle mode or an inactive mode; and determining to switch modes from the idle mode or the inactive mode to a connected mode based at least in part on a quality of service preference of the UE.

Aspect 12: The method of aspect 11, wherein transmitting the message with the UAI further comprises: transmitting the message with the UAI during radio resource control connection establishment of a random access procedure based at least in part on the determination to switch modes from the idle mode or the inactive mode to the connected mode.

Aspect 13: The method of aspect 12, wherein the message with the UAI is included in a RACH procedure msg3 or RACH procedure msg5.

Aspect 14: The method of any of aspects 1 through 13, further comprising: receiving the multicast transmissions while the UE is in a connected mode; determining to switch modes from the connected mode to an idle mode or an inactive mode based at least in part on a power consumption preference of the UE; transmitting the message with the UAI prior to switching from the connected mode to the idle mode or the inactive mode; and switching from the connected mode to the idle mode or the inactive mode.

Aspect 15: The method of any of aspects 1 through 14, wherein receiving the multicast transmissions further comprises: receiving the multicast transmissions from a serving cell that also provides unicast transmissions to the UE.

Aspect 16: The method of any of aspects 1 through 15, further comprising: identifying that the UE receives unicast transmissions from a reserved cell that is different from the cell that is transmitting the multicast transmissions.

Aspect 17: The method of aspect 16, further comprising: transmitting second UAI to the reserved cell, wherein the second UAI comprises one or more of a carrier or bandwidth part preference for a unicast service, a unicast processing capability, a timing preference for the unicast service, or a power preference for the unicast service, the unicast processing capability comprising an indication of a least one of a number of control resources set the UE supports for unicast communications, or a UE capability type.

Aspect 18: An apparatus comprising at least one means for performing a method of any of aspects 1 to 17.

Aspect 19: An apparatus for wireless communications comprising a processor; memory coupled with the processor; and instructions stored in the memory and executable by the processor to cause the apparatus to perform a method of any of aspects 1 to 17.

Aspect 20: A non-transitory computer-readable medium storing code for wireless communications, the code comprising instructions executable by a processor to perform a method of any of aspects 1 to 17.

Aspect 21: A method for wireless communication at a network node, comprising: receiving, from a user equipment (UE), a message associated with a multicast service; receiving, with the message, UAI indicating at least one of a UE capability to process multicast transmissions of the multicast service, a feedback scheme preference for reporting feedback for the multicast transmissions, a multicast priority indication, or a measurement and reporting scheme preference for the multicast transmissions; and communicating with the UE in accordance with the UAI.

Aspect 22: The method of aspect 21, wherein the network node is a core network node that transmits multicast transmissions to the UE in accordance with the UAI.

Aspect 23: The method of aspect 22, further comprising: identifying in the UAI, as the feedback scheme preference, an indication of at least one of a first feedback scheme associated with transmission of both ACK and NACK feedback, a second feedback scheme associated with transmission of group NACK feedback, or a third feedback scheme associated with transmission of no feedback.

Aspect 24: The method of any of aspects 22 or 23, further comprising: identifying in the UAI, as the measurement and reporting scheme preference, an indication of at least one of a first measurement and reporting scheme associated with layer one measurement and reporting, or a second measurement and reporting scheme associated with layer three measurement and reporting Aspect 25: The method of any of aspects 22 through 24, further comprising: identifying in the UAI, as the UE capability to process the multicast transmissions, an indication of at least one of a number of control resource sets the UE supports for multicast communications, a bandwidth the UE supports for multicast transmissions, or a UE capability type.

Aspect 26: The method of any of aspects 22 through 25, further comprising: identifying in the UAI at least one or a carrier preference for the multicast service, or a band or carrier measurement report.

Aspect 27: The method of any of aspects 21 through 26, wherein receiving the message with the UAI comprises: receiving the UAI in one or more layers based at least in part on a multicast architecture of a network providing the multicast service.

Aspect 28: The method of aspect 27, wherein the network node is a core network node and the multicast architecture comprises a communication flow for the message that flows from the UE to the core network node to a base station, wherein the base station establishes associated multicast radio bearers with the UE.

Aspect 29: The method of aspect 28, wherein receiving the message with the UAI further comprises: receiving the message with the UAI in a protocol data unit session establishment message, a protocol data unit session modification message, or a release request message.

Aspect 30: The method of any of aspects 27 through 29, herein the network node is a base station and the multicast architecture comprises a communication flow for the message that flows from the UE to the base station to a core network, wherein the core network establishes associated multicast radio bearers with the UE.

Aspect 31: The method of aspect 30, wherein receiving the message with the UAI further comprises: receiving the message with the UAI in a multicast broadcast service interest indication.

Aspect 32: The method of any of aspects 21 through 31, further comprising: transmitting the multicast transmissions while the UE is in an idle mode or an inactive mode; and receiving the message with the UAI during radio resource control connection establishment of a random access procedure based at least in part on a determination by the UE to switch modes from the idle mode or the inactive mode to a connected mode.

Aspect 33: The method of aspect 32, wherein the message with the UAI is included in a RACH procedure msg3 or RACH procedure msg5.

Aspect 34: The method of any of aspects 21 through 33, further comprising: transmitting the multicast transmissions while the UE is in a connected mode; and receiving the message with the UAI prior to the UE switching from the connected mode to an idle mode or an inactive mode.

Aspect 35: The method of any of aspects 21 through 34, wherein the network node transmits both the multicast transmissions to the UE and unicast transmissions to the UE.

Aspect 36: The method of any of aspects 21 through 35, wherein the network node is a serving cell serving the multicast transmissions.

Aspect 37: The method of aspect 36, further comprising: coordinating the multicast transmissions with one or more unicast transmissions transmitted by one or more other serving cells serving unicast transmissions, wherein the multicast transmissions and the one or more unicast transmissions are coordinated via time division multiplexing or frequency division multiplexing on a X2 or Xn interface.

Aspect 38: An apparatus comprising at least one means for performing a method of any of aspects 21 to 37.

Aspect 39: An apparatus for wireless communications comprising a processor; memory coupled with the processor; and instructions stored in the memory and executable by the processor to cause the apparatus to perform a method of any of aspects 21 to 37.

Aspect 40: A non-transitory computer-readable medium storing code for wireless communications, the code comprising instructions executable by a processor to perform a method of any of aspects 21 to 37.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or PDU or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying a multicast service available for subscription by the UE or to which the UE is already subscribed;
transmitting, while in a connected mode, a message associated with the multicast service, the message including UE assistance information indicating at least one of a UE capability to process multicast transmissions of the multicast service, a feedback scheme preference for reporting feedback for the multicast transmissions, a multicast priority indication, or a measurement and reporting scheme preference for the multicast transmissions;
receiving the multicast transmissions in accordance with the UE assistance information;
switching from the connected mode to an idle mode or an inactive mode based at least in part on a power consumption preference of the UE; and
continuing to receive the multicast transmissions while the UE is in the idle mode or the inactive mode, in accordance with the UE assistance information.

2. The method of claim 1, wherein receiving the multicast transmissions further comprises:
receiving the multicast transmissions from a serving cell that also provides unicast transmissions to the UE.

3. The method of claim 1, further comprising:
identifying that the UE receives unicast transmissions from a reserved cell that is different from a cell that is transmitting the multicast transmissions.

4. The method of claim 3, further comprising:
transmitting second UE assistance information to the reserved cell, wherein the second UE assistance information comprises one or more of a carrier or bandwidth part preference for a unicast service, a unicast processing capability, a timing preference for the unicast service, or a power preference for the unicast service, the unicast processing capability comprising an indication of a least one of a number of control resources set the UE supports for unicast communications, or a UE capability type.

5. The method of claim 1, further comprising:
including in the UE assistance information, as the feedback scheme preference, an indication of at least one of a first feedback scheme associated with transmission of both positive and negative acknowledgment feedback, a second feedback scheme associated with transmission of group negative acknowledgment feedback, or a third feedback scheme associated with transmission of no feedback.

6. The method of claim 1, further comprising:
including in the UE assistance information, as the measurement and reporting scheme preference, an indication of at least one of a first measurement and reporting scheme associated with layer one measurement and reporting, or a second measurement and reporting scheme associated with layer three measurement and reporting.

7. The method of claim 1, further comprising:
including in the UE assistance information, as the UE capability to process the multicast transmissions, an indication of at least one of a number of control resource sets the UE supports for multicast communications, a bandwidth the UE supports for multicast transmissions, or a UE capability type.

8. The method of claim 1, further comprising:
including in the UE assistance information at least one of a carrier preference for the multicast service, or a band or carrier measurement report.

9. The method of claim 1, wherein transmitting the message with the UE assistance information comprises:
transmitting the UE assistance information in one or more layers based at least in part on a multicast architecture of a network providing the multicast service.

10. The method of claim 9, wherein the multicast architecture comprises a communication flow for the message that flows from the UE to a core network to a base station, wherein the base station establishes associated multicast radio bearers with the UE.

11. The method of claim 10, wherein transmitting the message with the UE assistance information further comprises:
transmitting the message with the UE assistance information in a protocol data unit session establishment message, a protocol data unit session modification message, or a release request message.

12. The method of claim 9, wherein the multicast architecture comprises a communication flow for the message that flows from the UE to a base station to a core network, wherein the core network establishes associated multicast radio bearers with the UE.

13. The method of claim 12, wherein transmitting the message with the UE assistance information further comprises:
transmitting the message with the UE assistance information in a multicast broadcast service interest indication.

14. The method of claim 1, further comprising:
receiving the multicast transmissions while the UE is in an idle mode or an inactive mode; and
determining to switch modes from the idle mode or the inactive mode to a connected mode based at least in part on a quality of service preference of the UE.

15. The method of claim 14, wherein transmitting the message with the UE assistance information further comprises:
transmitting the message with the UE assistance information during radio resource control connection establishment of a random access procedure based at least in part on the determination to switch modes from the idle mode or the inactive mode to the connected mode.

16. A method for wireless communication at a network node, comprising:
receiving, from a user equipment (UE), a message associated with a multicast service;
receiving, with the message while the UE is in a connected mode, UE assistance information indicating at least one of a UE capability to process multicast transmissions of the multicast service, a feedback scheme preference for reporting feedback for the multicast transmissions, a multicast priority indication, or a measurement and reporting scheme preference for the multicast transmissions, wherein the message is received prior to the UE switching from the connected mode to an idle mode or an inactive mode based at least in part on a power consumption preference of the UE; and
communicating multicast transmissions to the UE while the UE is in the idle mode or the inactive mode, in accordance with the UE assistance information.

17. The method of claim 16, wherein the network node transmits both the multicast transmissions and unicast transmissions to the UE.

18. The method of claim 16, wherein the network node is a serving cell serving the multicast transmissions.

19. The method of claim 18, further comprising:
coordinating the multicast transmissions with one or more unicast transmissions transmitted by one or more other serving cells serving unicast transmissions, wherein the multicast transmissions and the one or more unicast transmissions are coordinated via time division multiplexing or frequency division multiplexing on a X2 or Xn interface.

20. The method of claim 16, wherein the network node is a core network node that transmits multicast transmissions to the UE in accordance with the UE assistance information.

21. The method of claim 20, further comprising:
identifying in the UE assistance information, as the feedback scheme preference, an indication of at least one of a first feedback scheme associated with transmission of both positive and negative acknowledgment feedback, a second feedback scheme associated with transmission of group negative acknowledgment feedback, or a third feedback scheme associated with transmission of no feedback.

22. The method of claim 20, further comprising:
identifying in the UE assistance information, as the measurement and reporting scheme preference, an indication of at least one of a first measurement and reporting scheme associated with layer one measurement and reporting, or a second measurement and reporting scheme associated with layer three measurement and reporting.

23. The method of claim 20, further comprising:
identifying in the UE assistance information, as the UE capability to process the multicast transmissions, an indication of at least one of a number of control resource sets the UE supports for multicast communications, a bandwidth the UE supports for multicast transmissions, or a UE capability type.

24. The method of claim 20, further comprising:
identifying in the UE assistance information at least one or a carrier preference for the multicast service, or a band or carrier measurement report.

25. The method of claim 16, wherein receiving the message with the UE assistance information comprises:
receiving the UE assistance information in one or more layers based at least in part on a multicast architecture of a network providing the multicast service.

26. The method of claim 25, wherein the network node is a core network node and the multicast architecture comprises a communication flow for the message that flows from the UE to the core network node to a base station, wherein the base station establishes associated multicast radio bearers with the UE.

27. An apparatus for wireless communication, comprising:
at least one processor; and
memory coupled with the at least one processor, the memory storing instructions that are executable by the at least one processor to cause the apparatus to:
identify a multicast service available for subscription by a user equipment (UE) or to which the UE is already subscribed;
transmit, while in a connected mode, a message associated with the multicast service, the message including UE assistance information indicating at least one of a UE capability to process multicast transmissions of the multicast service, a feedback scheme preference for reporting feedback for the multicast transmissions, a multicast priority indication, or a measurement and reporting scheme preference for the multicast transmissions;
receive the multicast transmissions in accordance with the UE assistance information;
switch from the connected mode to an idle mode or an inactive mode based at least in part on a power consumption preference of the UE; and
continue to receive the multicast transmissions while the UE is in the idle mode or the inactive mode, in accordance with the UE assistance information.

28. An apparatus for wireless communication, comprising:
at least one processor; and
memory coupled with the at least one processor, the memory storing instructions that are executable by the at least one processor to cause the apparatus to:
receive, from a user equipment (UE), a message associated with a multicast service;
receive, with the message while the UE is in a connected mode, UE assistance information indicating at least one of a UE capability to process multicast transmissions of the multicast service, a feedback scheme preference for reporting feedback for the multicast transmissions, a multicast priority indication, or a measurement and reporting scheme preference for the multicast transmissions, wherein the message is received prior to the UE switching from the connected mode to an idle mode or an inactive mode based at least in part on a power consumption preference of the UE; and
communicate multicast transmissions to the UE while the UE is in the idle mode or the inactive mode, in accordance with the UE assistance information.

* * * * *